(12) United States Patent
Song et al.

(10) Patent No.: US 11,937,677 B2
(45) Date of Patent: Mar. 26, 2024

(54) LUGGAGE

(71) Applicant: LINGDONG TECHNOLOGY (BEIJING) CO. LTD, Beijing (CN)

(72) Inventors: Wei Song, Beijing (CN); Herrickhui Yaozhang, Beijing (CN); Song Li, Beijing (CN); Ou Qi, Beijing (CN); Yaming Tang, Beijing (CN); Botao Zheng, Beijing (CN); Guopeng Zhang, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 1217 days.

(21) Appl. No.: 16/583,299

(22) Filed: Sep. 26, 2019

(65) Prior Publication Data

US 2020/0352293 A1  Nov. 12, 2020

(30) Foreign Application Priority Data

May 9, 2019  (CN) .......................... 201910384402.9
May 30, 2019  (CN) .......................... 201910460417.9
(Continued)

(51) Int. Cl.
*A45C 5/14* (2006.01)
*A45C 5/03* (2006.01)
(Continued)

(52) U.S. Cl.
CPC .................. *A45C 5/14* (2013.01); *A45C 5/03* (2013.01); *A45C 13/103* (2013.01); *A45C 15/00* (2013.01);
(Continued)

(58) Field of Classification Search
CPC .. A45C 5/14; A45C 5/03; A45C 13/03; A45C 15/00; B62B 3/02; B62B 5/0003;
(Continued)

(56) References Cited

U.S. PATENT DOCUMENTS 8,251,734 B2 *  8/2012  Katagiri .................. B60L 53/65
439/372
9,629,430 B1 *  4/2017  Getahun .................. A45C 5/03
(Continued)

FOREIGN PATENT DOCUMENTS

CN          1046415 A    10/1990
CN         201340941 Y   11/2009
(Continued)

OTHER PUBLICATIONS

Mechanical translation of CN107212547, Sep. 2017.*
Mechanical translation of CN104824944, Aug. 2015.*

*Primary Examiner* — John D Walters
(74) *Attorney, Agent, or Firm* — NZ CARR LAW OFFICE

(57) ABSTRACT

A piece of luggage including a main body and a power supplying module is disclosed. The main body includes a moving module including a plurality of wheels and a main motor and a power unit electrically connected to the moving module. The wheels include an active wheel electrically connected to the main motor. The power supplying module includes a power supplying unit including a power supplying box and a battery and a connecting unit including a connecting part, a holding part and a conducting wire. The power supplying box has an output port. The battery is disposed in the power supplying box and electrically connected to the output port. The connecting part has a power port corresponding to the output port. The holding part and the conducting wire are connected to the connecting part. The conducting wire is electrically connected to the power port and the power unit.

19 Claims, 23 Drawing Sheets

(30) Foreign Application Priority Data

Jun. 28, 2019 (CN) .................. 201920995423.X
Aug. 21, 2019 (CN) .................. 201921360479.4

(51) Int. Cl.

| | | |
|---|---|---|
| A45C 13/10 | (2006.01) | |
| A45C 15/00 | (2006.01) | |
| B08B 13/00 | (2006.01) | |
| B60B 33/00 | (2006.01) | |
| B60L 1/00 | (2006.01) | |
| B62B 3/02 | (2006.01) | |
| B62B 5/00 | (2006.01) | |
| B62B 5/06 | (2006.01) | |
| G08B 13/00 | (2006.01) | |
| G08B 21/18 | (2006.01) | |
| G08B 21/24 | (2006.01) | |
| H02J 7/00 | (2006.01) | |
| H02J 13/00 | (2006.01) | |

(52) U.S. Cl.
CPC .......... *B08B 13/00* (2013.01); *B60B 33/0092* (2013.01); *B60L 1/00* (2013.01); *B62B 3/02* (2013.01); *B62B 5/0003* (2013.01); *B62B 5/0069* (2013.01); *B62B 5/067* (2013.01); *G08B 13/00* (2013.01); *G08B 21/182* (2013.01); *G08B 21/24* (2013.01); *H02J 7/00* (2013.01); *H02J 13/00032* (2020.01); *B62B 2202/24* (2013.01)

(58) Field of Classification Search
CPC ... B62B 5/0069; B62B 5/067; B62B 2202/24; G08B 13/00; G08B 21/182; G08B 21/24
See application file for complete search history.

(56) References Cited

U.S. PATENT DOCUMENTS

| | | | | |
|---|---|---|---|---|
| 9,770,084 | B1 * | 9/2017 | Shiekh | A45C 13/005 |
| 9,870,683 | B1 * | 1/2018 | Pious | A45C 15/00 |
| 10,103,566 | B2 * | 10/2018 | Curescu | A45C 15/00 |
| 11,006,718 | B2 * | 5/2021 | Bhatnagar | H02J 7/0045 |
| 11,700,927 | B2 * | 7/2023 | Osseiran | A45C 13/262 |
| | | | | 190/18 A |
| 2020/0187617 | A1 * | 6/2020 | Melkebeke | A45C 5/146 |

FOREIGN PATENT DOCUMENTS

| | | | | |
|---|---|---|---|---|
| CN | 102714375 A | | 10/2012 | |
| CN | 104184175 A | | 12/2014 | |
| CN | 104824944 A | * | 8/2015 | ............ A45C 15/00 |
| CN | 204742976 U | | 11/2015 | |
| CN | 204763881 U | | 11/2015 | |
| CN | 206137459 U | | 5/2017 | |
| CN | 107183880 A | | 9/2017 | |
| CN | 107212547 A | * | 9/2017 | .......... A45C 13/001 |
| CN | 206866841 U | | 1/2018 | |
| CN | 206895985 U | | 1/2018 | |
| CN | 207084361 U | | 3/2018 | |
| CN | 207285483 U | | 5/2018 | |
| CN | 108113154 A | | 6/2018 | |
| CN | 207856138 U | | 9/2018 | |
| CN | 108669741 A | | 10/2018 | |
| CN | 208096287 U | | 11/2018 | |
| CN | 208624767 U | | 3/2019 | |
| CN | 109662419 A | | 4/2019 | |
| WO | 2019/021219 A1 | | 1/2019 | |

\* cited by examiner

//DUMMY//
LUGGAGE

BACKGROUND OF THE INVENTION

1. Field of the Invention

The present invention relates to a piece of luggage, and more particularly, to a piece of luggage comprising a power supplying module capable of holding a power supplying unit.

2. Description of the Prior Art

Pieces of luggage are widely used daily commodities. Recently, the luggage with automotive or power charging functions continually evolves. Therefore, power supplying units are disposed on partial of the luggage, and an electric port is connected to the power supplying units to provide the luggage with electricity needed for moving. The power supplying units also act as electricity sources capable of charging a portable device of a user. However, when the luggage moves, a sudden bump due to a road may make the connection between the power port and the power supplying unit to loose, and cause the luggage to stop moving or a halt of the charging for the portable device.

SUMMARY OF THE INVENTION

The present invention provides a piece of luggage comprising a power supplying module. The power supplying module comprises a holding part capable of holding a power supplying unit to prevent loosening.

According to an embodiment of the present invention, the luggage comprises a main body and a power supply module. The main body comprises a moving module and a power unit. The moving module comprises a plurality of wheels and a main motor. The wheels comprise an active wheel. The main motor is electrically connected to the active wheel. The power unit is disposed in the main body and electrically connected to the moving module. The power supplying module comprises a power supplying unit and a connecting unit. The power supplying unit comprises a power supplying box and a battery. The power supplying box has an output port. The battery is disposed in the power supplying box, and the output port is electrically connected to the battery. The connecting unit comprises a connecting part, a holding part and a conducting wire. The connecting part has a power port, and the power port is corresponding to the output port. The holding part is connected to the connecting part. The conducting wire is connected to the connecting part and electrically connected to the power port and the power unit, and the connecting unit is connected to the main body through the conducting wire. When the power port is connected to the output port, the power supplying unit is electrically connected to the power unit, and the holding part abuts against the power supplying box to hold the power supplying unit.

Preferably, a concaved portion is formed on the power supplying box. The holding part comprises a chuck, and the chuck is pivoted to the connecting part. When the holding part holds the power supplying unit, the chuck clamps the concaved portion.

Preferably, the holding part further comprises an elastic member disposed between the chuck and the connecting part.

Preferably, the connecting unit further comprises a locking part. The locking part comprises a locking housing and a locking member. The conducting wire passes through the locking housing, and the locking member is inbuilt in the locking housing. The main body further comprises a wall, and the locking housing and the conducting wire are fixed on the wall through the locking member.

Preferably, the power supplying box further has an input port and an auxiliary port. The input port and the auxiliary port are electrically connected to the battery. The input port is configured to be electrically connected to an external power source, and the auxiliary port is configured to be electrically connected to a portable electric device.

Preferably, the power supplying box further comprises a plurality of cover portions. The cover portions are movably connected to the power supplying box and cover the input port and the auxiliary port.

Preferably, an accommodating space is formed on the main body. The luggage further comprises a storage bag. The storage bag is attached to the main body and disposed in the accommodating space. The storage bag comprises a bag body and at least one fixing member. The power supplying module is disposed in the bag body, and the conducting wire is connected to the main body and passes through the bag body. The fixing member is disposed on the bag body. The bag body is mounted to the main body through the fixing member.

Preferably, the bag body comprises a first bag portion and a second bag portion. The first bag portion comprises a first top edge, a first bottom edge, a first side edge and a second side edge. The first side edge and the second side edge are both adjacent to the first top edge and the first bottom edge. The second bag portion comprises a second top edge, a second bottom edge, a third side edge and a fourth side edge. The third side edge and the fourth side edge are both adjacent to the second top edge and the second bottom edge. The first bottom edge is fixed to the second bottom edge. A zipper is disposed on the first top edge, the first side edge, the second side edge, the second top edge, the third side edge and the fourth side edge. The second bag portion is selectively connected to the first bag portion through the zipper.

Preferably, the main body further comprises a control unit. The control unit is disposed in the main body and electrically connected to the power unit and the moving module. The storage bag further comprises a transducer. The transducer is disposed on the bag body and electrically connected to the power unit and the control unit. The zipper comprises a zipper slider. When at least one wheel of the wheels is rolling on a floor, and the transducer does not detect the zipper slider locating at a predetermined position, the control unit controls the main motor to stop operating.

Preferably, the luggage further comprises a control unit and an indication module. The control unit is disposed in the main body and electrically connected to the power unit. The indication module is electrically connected to the power unit and the control unit and comprises an alarm unit. The storage bag further comprises a transducer. The transducer is disposed on the bag body and electrically connected to the power unit and the control unit. The zipper comprises a zipper slider. When at least one wheel of the wheels is rolling on a floor, and the transducer does not detect the zipper slider locating at a predetermined position, the control unit controls the alarm unit to raise an alarm.

Preferably, the bag body comprises a first bag portion and a second bag portion. The second bag portion is openably connected to the first bag portion. The storage bag further comprises a first inner lining part and a second inner lining part. The first inner lining part is fixed to the first bag portion and comprises a first connecting feature. The second inner lining part is fixed to the second bag portion and comprises a second connecting feature. The second connecting feature is corresponding to the first connecting feature. When the second bag portion is opened relative to the first bag portion, and the first inner lining part is connected to the second inner lining part through the first connecting feature and the second connecting feature, the first bag portion, the first inner lining part, the second bag portion and the second inner lining part cooperatively defines a storage space.

Preferably, the first bag portion comprises a first top edge, a first bottom edge, a first side edge and a second side edge. The first side edge and the second side edge are both adjacent to the first top edge and the first bottom edge. The second bag portion comprises a second top edge, a second bottom edge, a third side edge and a fourth side edge. The third side edge and the fourth side edge are both adjacent to the second top edge and the second bottom edge. The first inner lining part further comprises a first side edge inner lining and a second side edge inner lining. The first side edge inner lining is fixed to the first side edge. The second side edge inner lining is fixed to the second side edge. The second inner lining part further comprises a third side edge inner lining and a fourth side edge inner lining. The third side edge inner lining is fixed to the third side edge. The fourth side edge inner lining is fixed to the fourth side edge. The first connecting feature comprises a first connecting part and a second connecting part. The first connecting part is disposed on the first side edge inner lining. The second connecting part is disposed on the second side edge inner lining. The second connecting feature comprises a third connecting part and a fourth connecting part. The third connecting part is disposed on the third side edge inner lining. The fourth connecting part is disposed on the fourth side edge inner lining. When the first inner lining part is connected to the second inner lining part through the first connecting feature and the second connecting feature, the first side edge inner lining is connected to the third side edge inner lining through the first connecting part and the third connecting part, and the second side edge inner lining is connected to the fourth side edge inner lining through the second connecting part and the fourth connecting part.

Preferably, the main body further comprises a rib portion. The storage bag further comprises an auxiliary inner lining part and an auxiliary connecting part. The auxiliary inner lining part is fixed to an edge of the first bag portion, and the auxiliary connecting part is disposed to a location corresponding to the rib portion on the first bag portion. The auxiliary inner lining part and the auxiliary connecting part respectively comprise a binding feature, and the auxiliary inner lining part is selectively bound to the auxiliary connecting part through the binding feature.

Preferably, the fixing member is ring-shaped or sheet-shaped. A shape of the fixing member is corresponding to a portion of the accommodating space, and a rigidity of the fixing member is greater than a rigidity of the bag body.

Preferably, the luggage further comprises a control unit and an indication module. The control unit is disposed in the main body and electrically connected to the power unit and the moving module. The indication module is electrically connected to the power unit and the control unit and comprises an alarm unit. When electricity of the battery is lower than a predetermined threshold, the control unit controls the alarm unit to raise an alarm.

Preferably, the indication module further comprises a communication unit. The alarm unit is disposed on a wearable device, and the communication unit is electrically connected to the alarm unit. When the electricity of the battery is lower than the predetermined threshold, the control unit controls the communication unit to send out a signal to activate the alarm unit to raise the alarm.

Preferably, the luggage further comprises a control unit. The control unit is disposed in the main body and electrically connected to the power unit and the moving module. The moving module further comprises an elevating mechanism. The elevating mechanism is disposed in the main body and electrically connected to the power unit and the control unit. The elevating mechanism comprises a housing, an elevating motor, a first link, a pivoting member and a second link. The elevating motor is disposed in the housing. The first link is pivoted to the housing and coupled to the elevating motor. The pivoting member is connected to the housing. The second link is pivoted to the housing through the pivoting member. A center of the active wheel is fixed relative to the second link, and an end of the first link is slidably connected to the second link. When the elevating motor drives the first link to drive the second link and the active wheel to revolve to a descending position, the active wheel extrudes from the housing and contacts a floor. When electricity of the battery is lower than the predetermined threshold, the control unit controls the elevating motor to drive the first link to drive the second link and the active wheel to revolve to an ascending position, so as to make the active wheel leave the floor and a portion of the active wheel accommodated in the housing.

Preferably, the elevating mechanism further comprises a base disposed in the housing. The base is pivoted to the housing through the pivoting member and moves synchronously with the second link. The active wheel is pivoted to the base, and the main motor is disposed on the base.

Preferably, the elevating mechanism further comprises a damper connected to the second link and the base. The second link comprises a limiting portion, and the base abuts against the limiting portion.

Preferably, the elevating mechanism further comprises a worm and a worm gear. The elevating motor is coupled to the worm. The first link is fixed to the worm gear. The worm is engaged to the worm gear, and a magnetic member and a magnetic sensing member are disposed on the worm gear.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
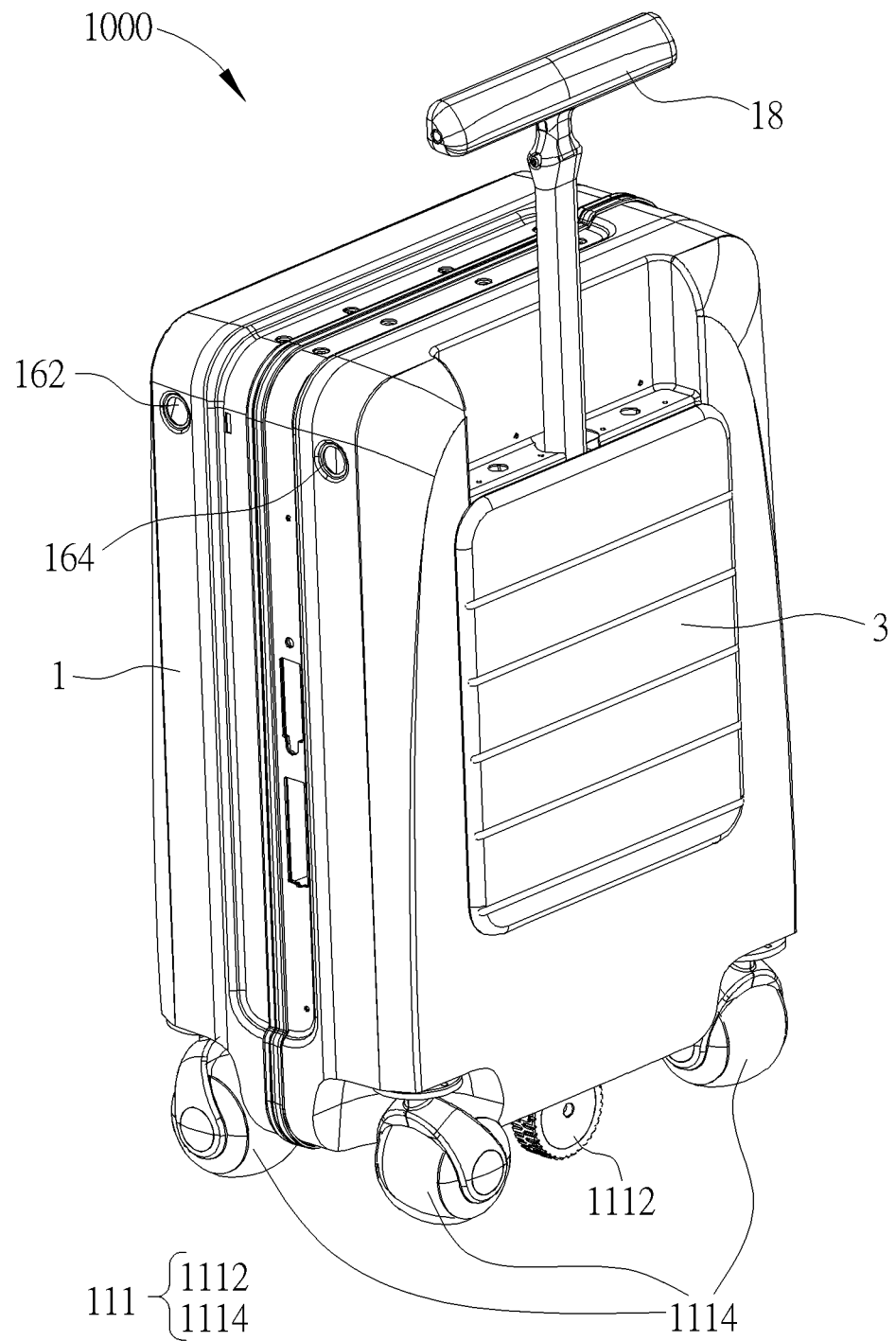
FIG. 1 is a perspective diagram of apiece of luggage according to an embodiment of the present invention.
Figure 2:
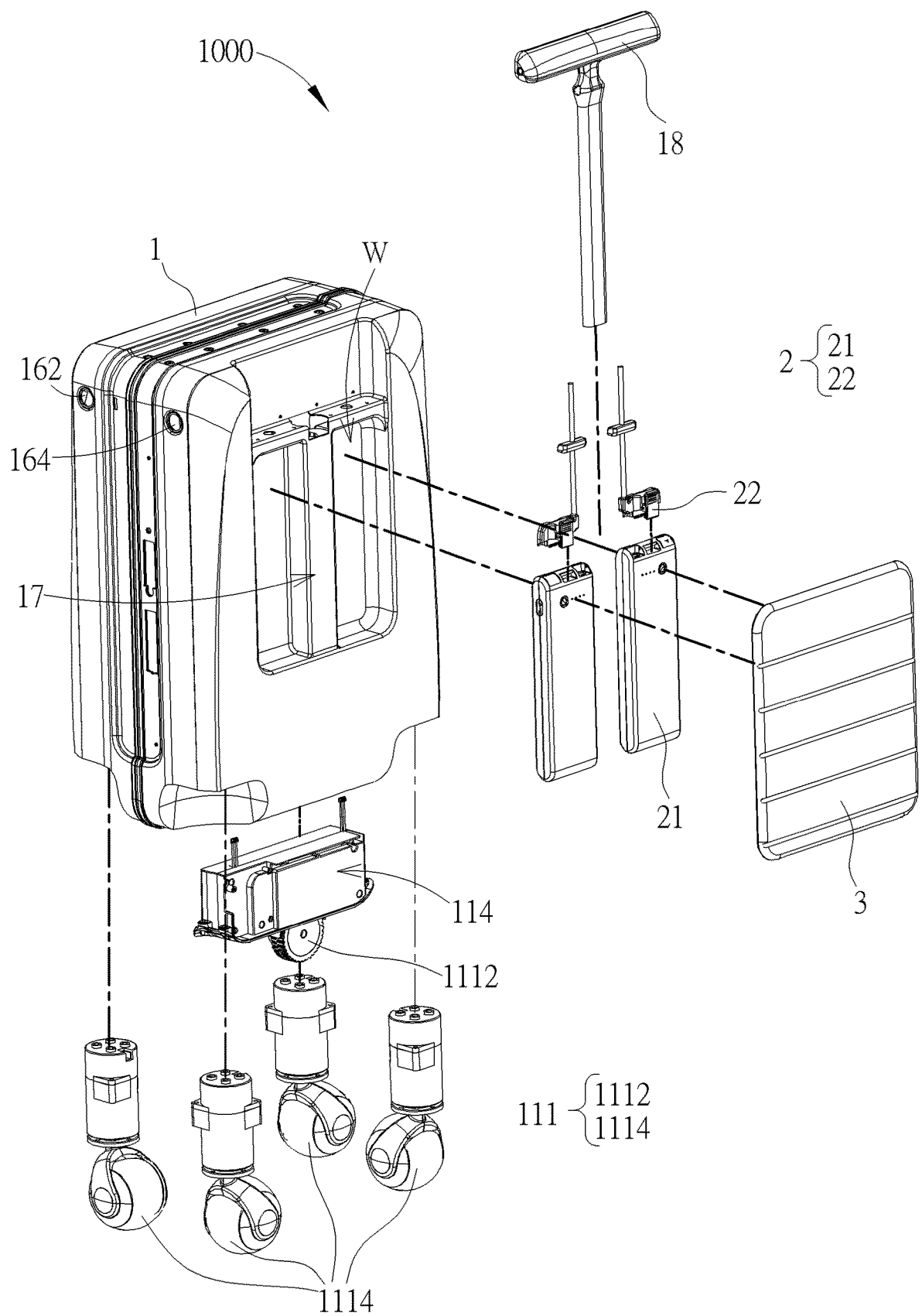
FIG. 2 is an exploded diagram of the luggage in FIG. 1.
Figure 3:
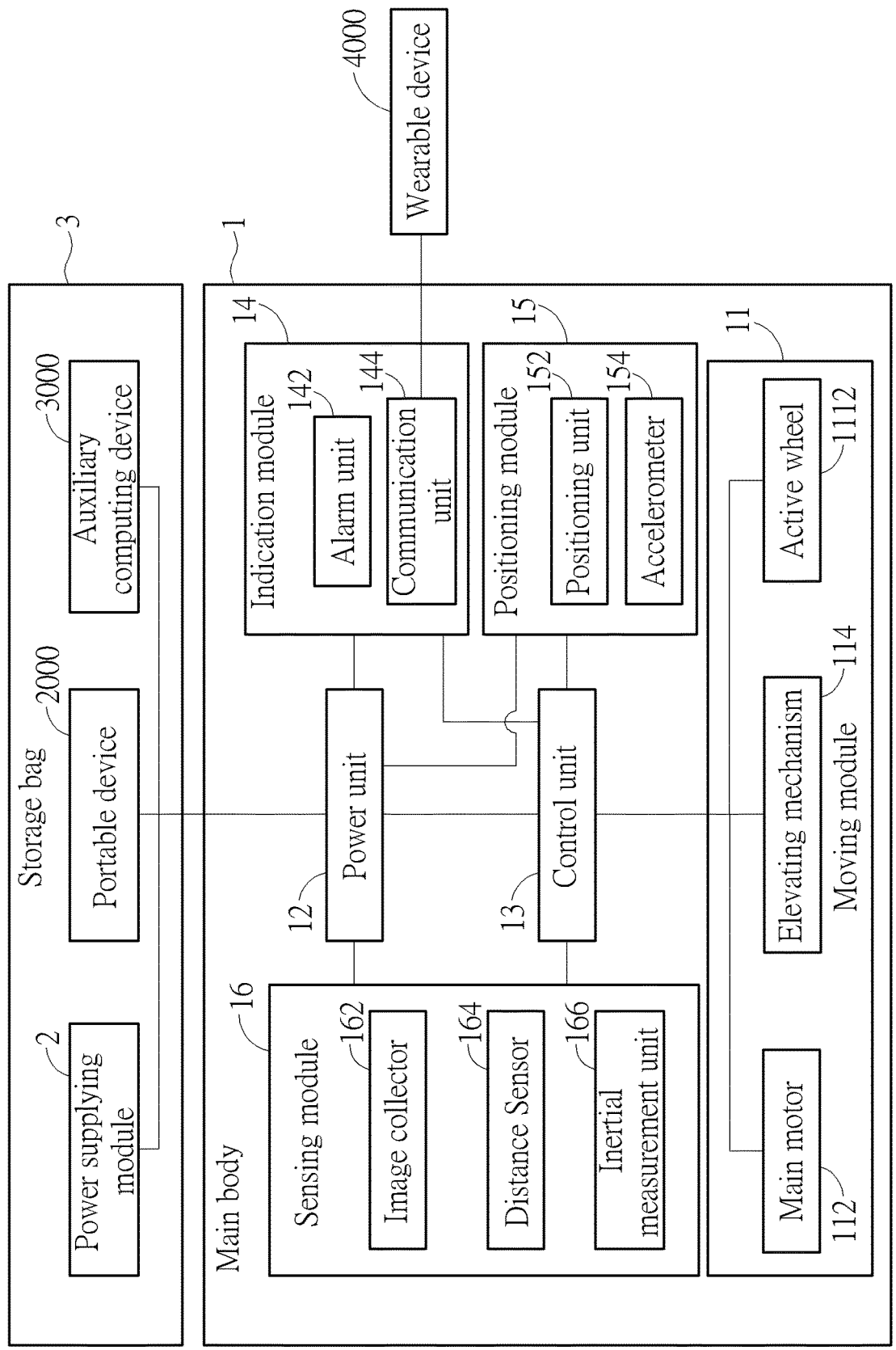
FIG. 3 is a block diagram of electric components of the luggage in FIG. 1.

FIG. 1 is a perspective diagram of a piece of luggage according to an embodiment of the present invention. FIG. 2 is an exploded diagram of the luggage in FIG. 1. FIG. 3 is a block diagram of electric components of the luggage in FIG. 1. Please refer to FIG. 1 to FIG. 3. The luggage 1000 in the embodiment comprises a main body 1 and a power supplying module 2. The main body 1 comprises a moving module 11 and a power unit 12. The moving module 11 comprises a plurality of wheels 111 and a main motor 112. The wheels 111 comprises an active heel 1112 and several passive wheels 1114. The main motor 112 is electrically connected to the active wheel 1112, and the power unit 12 is disposed in the main body 1 and electrically connected to the moving module 11.

Specifically, the luggage 1000 has an automotive function. That is, the luggage 1000 is capable of being electrically connected to the power supplying module 2 to gain electricity and being driven to move autonomously. Preferably, the main body 1 further comprises a handle 18 for a user to drag the luggage 1000 by hands. Moreover, the main body 1 further comprises a control unit 13. The control unit 13 is electrically connected to the power unit 12 and the moving module 11 and able to control an operating speed of the main motor 112. Thereby, the moving module 11 is configured to receive the electricity from the power unit 12 and a signal transmitted from the control unit 13 to drive the active wheel 1112, and drives the luggage 1000 to move with aid of the passive wheels 1114.

Refer to FIG. 3. In the embodiment, the moving module 11 further comprises a speed sensor (not shown in the figure) configured to detect an operating speed of the main motor 112 or the rotation speed of the active wheel 1112 and transmit the result to the control unit 13. On the other hand, in another preferable embodiment, the main body 1 further comprises a positioning module 15 electrically connected to the power unit 12 and the control unit 13. The positioning module 15 comprises a positioning unit 152 and an accelerometer 154. The accelerometer 154 is capable of detecting a translating acceleration or a revolving acceleration of the luggage 1000 to prevent the luggage 1000 from dumping due to translation or revolution in an overspeed. The positioning unit 152 can be selected from various positioning components according to the usage of the luggage 1000. For example, if the luggage 1000 is usually used outdoors, the positioning unit 152 can be a global positioning system component. If the luggage 1000 is used indoors for most of the time, the positioning unit 152 can be an ultra-wideband transceiver. However, the selection of the positioning unit 152 is not limited thereto. As long as a positioning component capable of precisely detecting or computing a position of the moving luggage 1000 in the working environment, it can be chosen for the positioning unit 152 like a Wi-Fi transceiver, a RFID transceiver or a Bluetooth transceiver.

Besides, in another preferable embodiment, the main body 1 further comprises a sensing module 16 electrically connected to the power unit 12 and the control unit 13. The sensing module 16 comprises an image collector 162, a distance sensor 164 and an inertial measurement unit 166. The image collector 162 can be a camera with a tripod head, which is capable of capturing images of surroundings and transferring them back to the control unit 13 to guide the luggage 1000 to move to a right position. Otherwise, the image collector 162 can recognize authentication information on the user to follow the user synchronously. On the other hand, the distance sensor 164 can be a laser sensor or an ultrasound sensor configured to detect a distance from obstacles in the surroundings to the luggage 1000 to prevent an impact when the luggage 1000 moves autonomously. The inertial measurement unit 166 is capable of calculating or predicting the current position of the luggage 1000 according to information such as a posture, a revolving angular speed and a translating speed by knowing a previous position of the luggage 1000.

Figure 4:
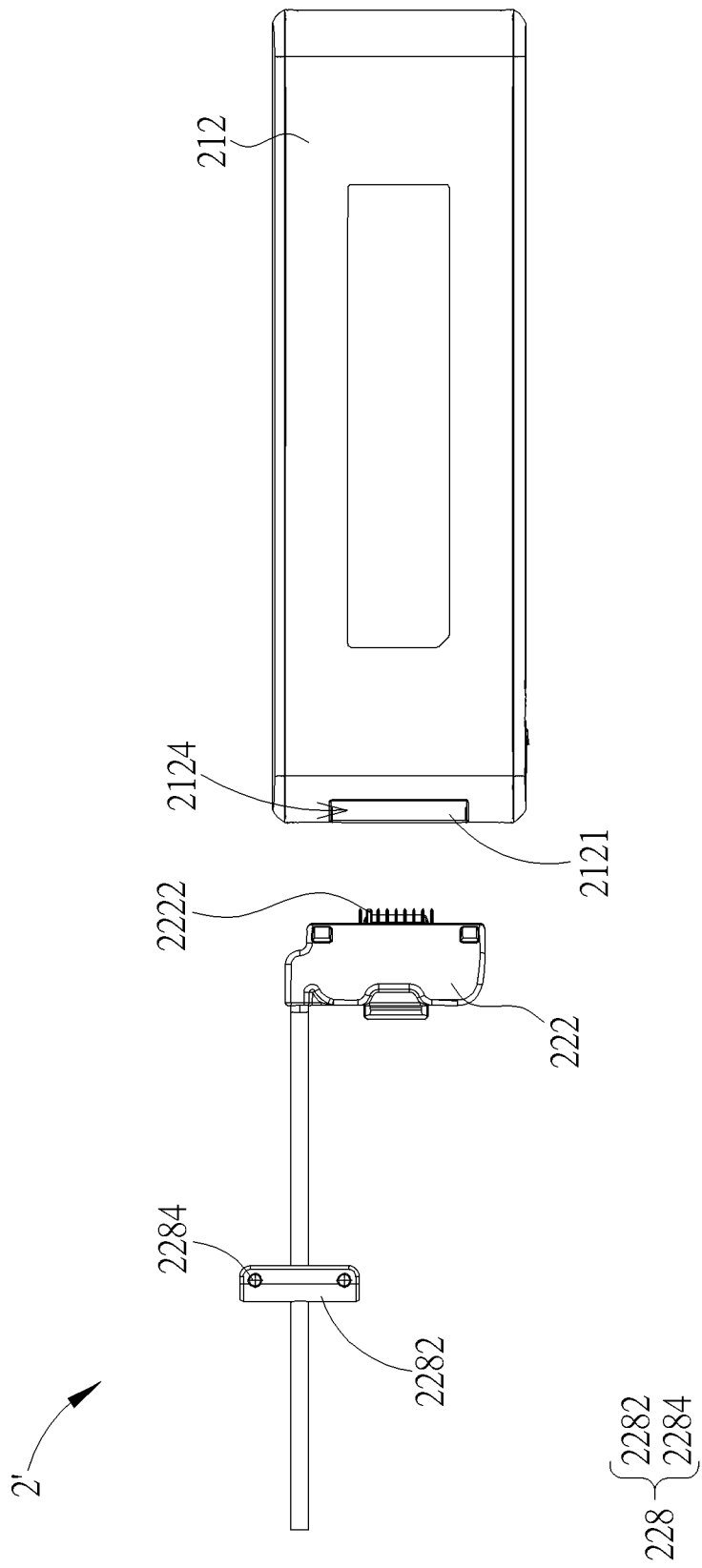
FIG. 4 is a front view of a power supplying module in FIG. 2.
Figure 5:
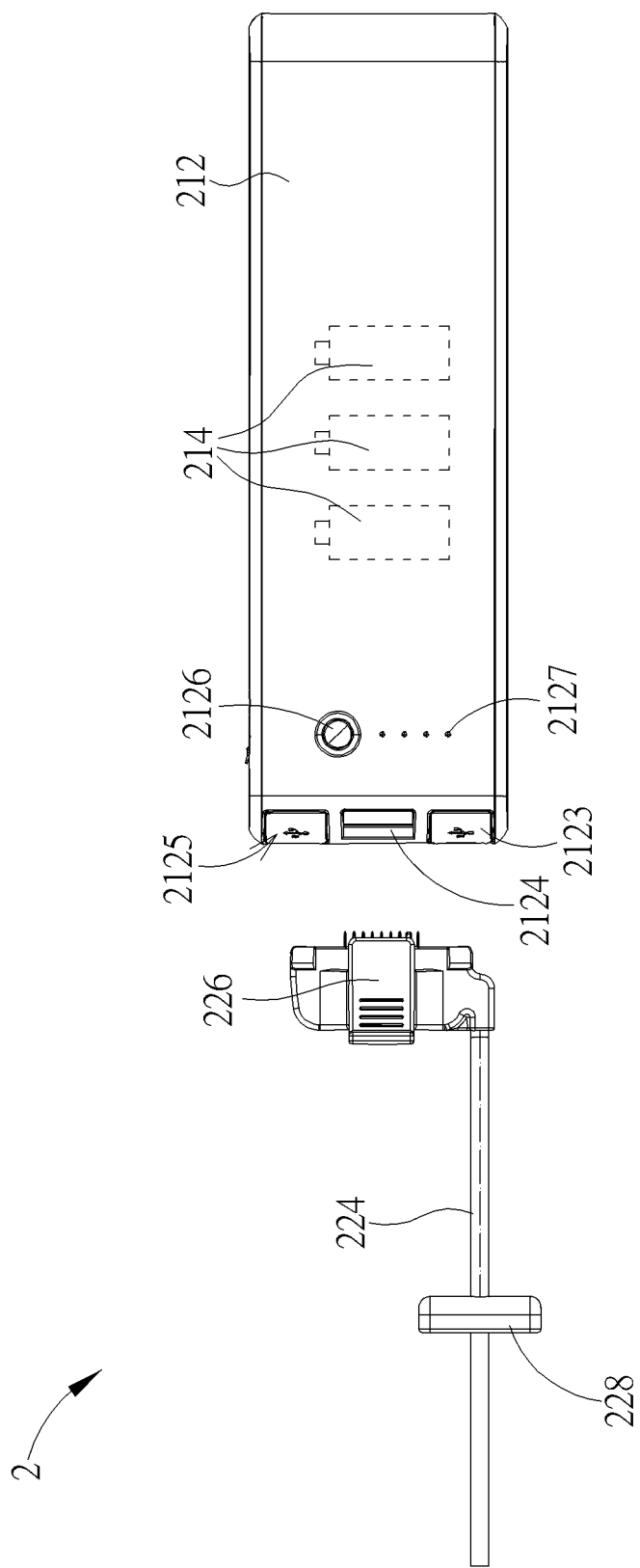
FIG. 5 is a back view of the power supplying module in FIG. 2.
Figure 6:
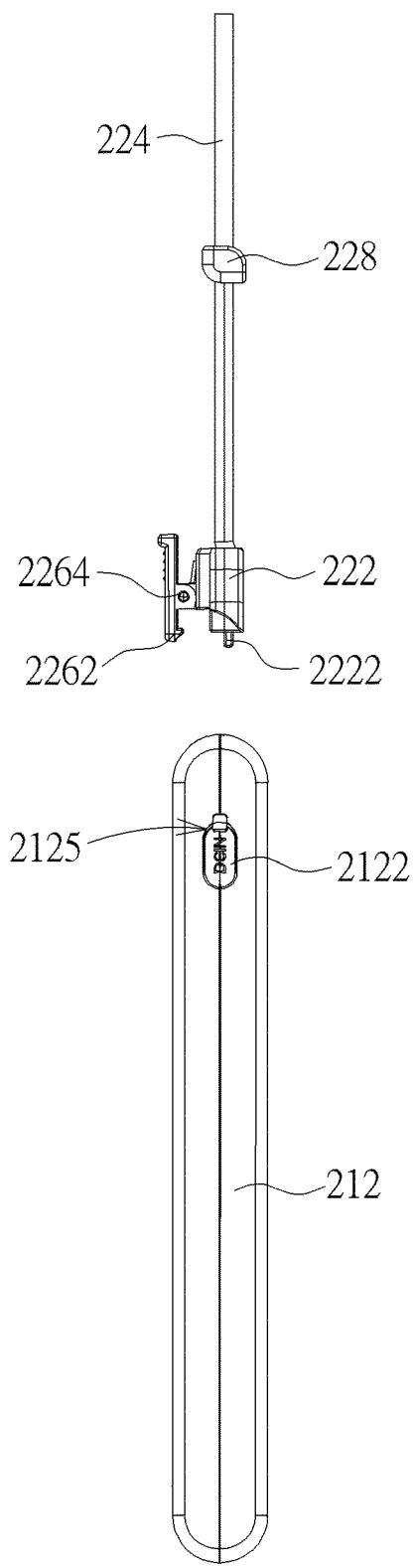
FIG. 6 is a side view of the power supplying module in FIG. 2.
Figure 7:
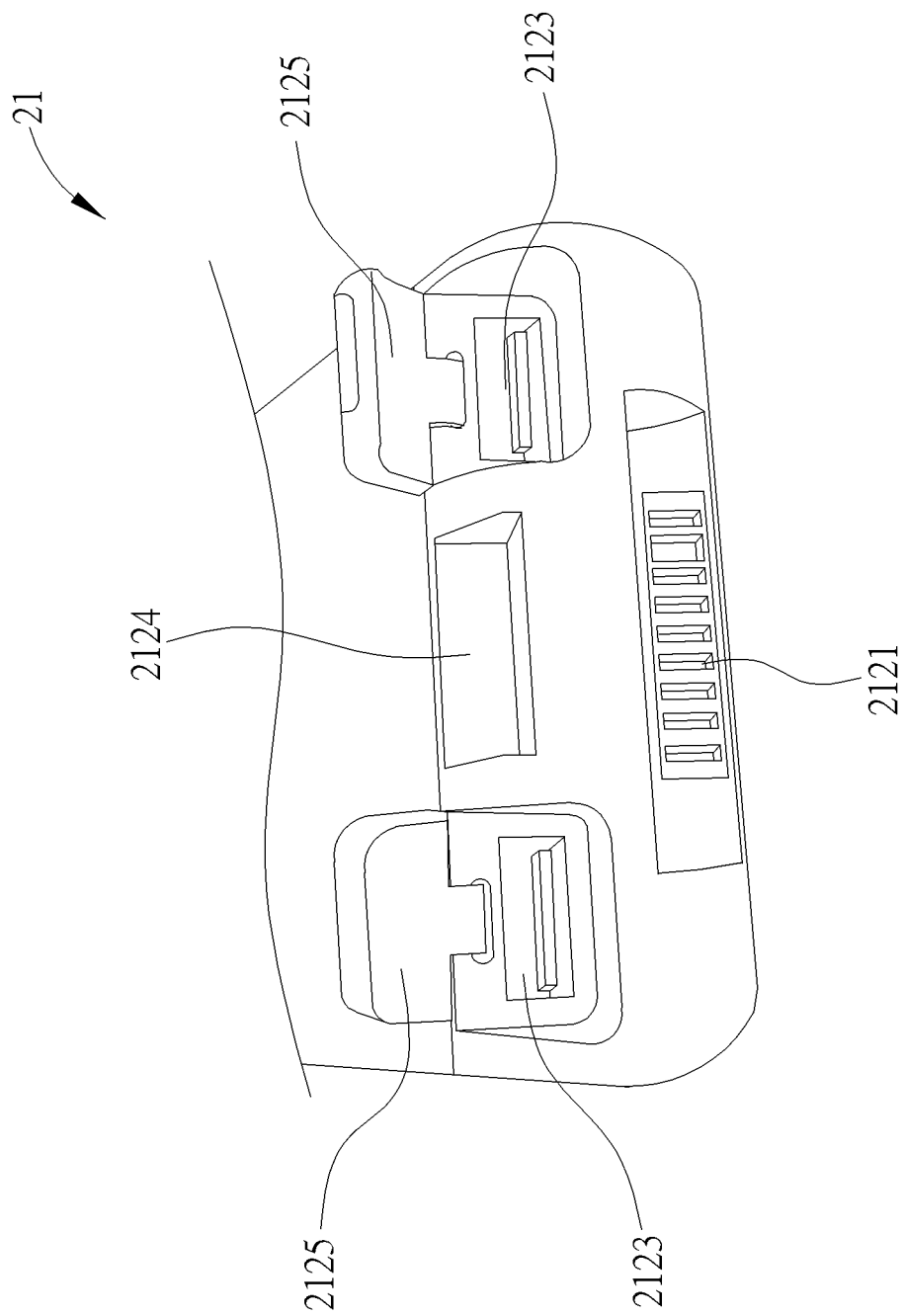
FIG. 7 is a perspective diagram of the power supplying module in FIG. 2 from another viewpoint.
Figure 8:
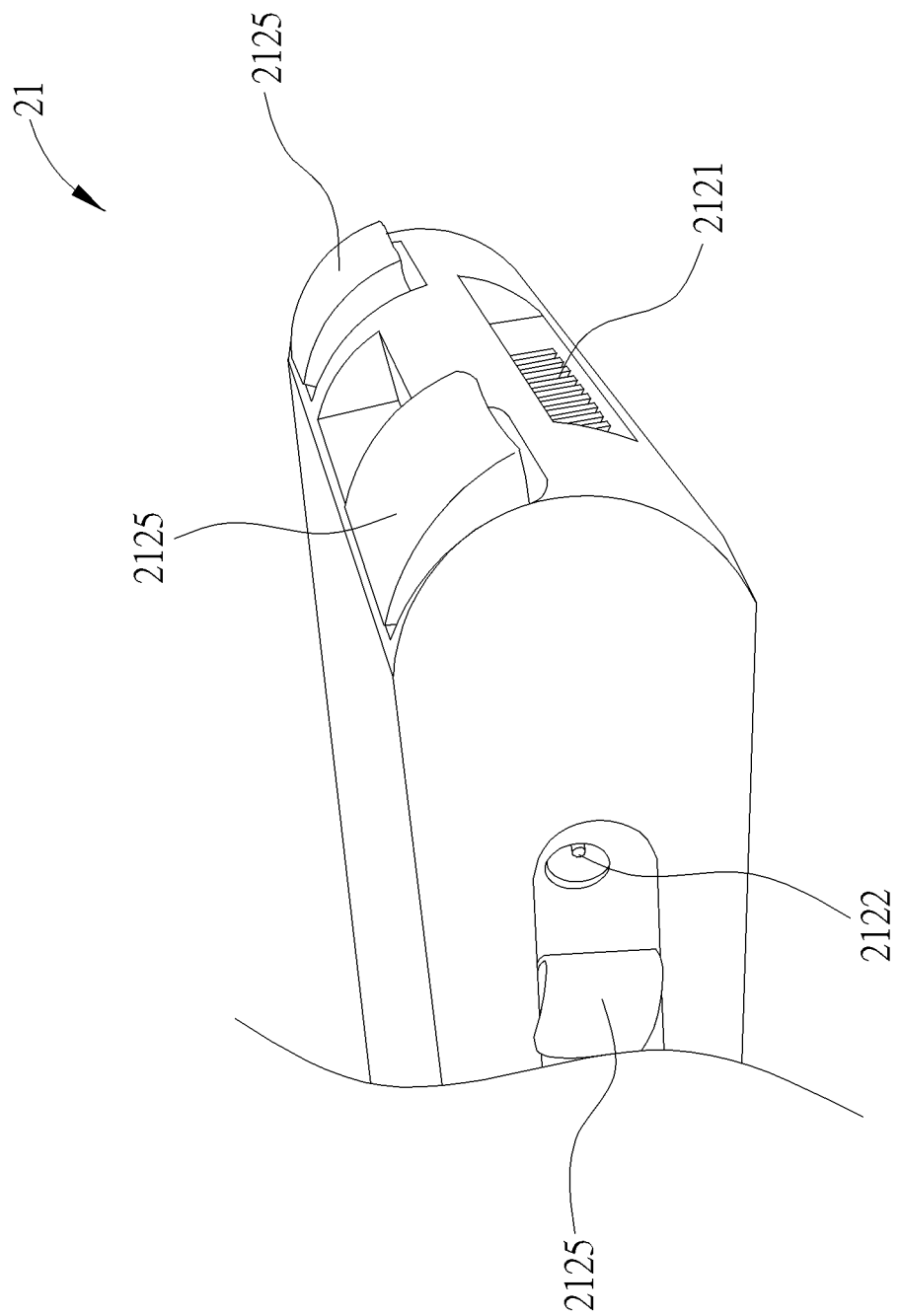
FIG. 8 is a perspective diagram of the power supplying module in FIG. 2 from another viewpoint.

FIG. 4 is a front view of a power supplying module in FIG. 2. FIG. 5 is a back view of the power supplying module in FIG. 2. FIG. 6 is a side view of the power supplying module in FIG. 2. FIG. 7 is a perspective diagram of the power supplying module in FIG. 2 from another viewpoint. FIG. 8 is a perspective diagram of the power supplying module in FIG. 2 from another viewpoint. Please refer to FIG. 4 to FIG. 8. In the embodiment, the power supplying module 2 comprises a power supplying unit 21 and a connecting unit 22. The power supplying unit 21 comprises a power supplying box 212 and at least one battery 214. The battery 214 is disposed in the power supplying box 212. The connecting unit 22 comprises a connecting part 222, a holding part 226 and a conducting wire 224. The conducting wire 224 is connected to the connecting part 222 and electrically connected to the power unit 12. The connecting unit 22 is connected to the main body 1 through the conducting wire 224, and the holding part 226 is connected to the connecting part 222.

The power supplying module 2 is configured to provide electricity to the power unit 12 of the main body 1. Specifically, the power supplying box 212 has an output port 2121, and the output port 2121 is electrically connected to the battery 214. The connecting part 222 has a power port 2222 corresponding to the output port 2121, and the conducting wire 224 is electrically connected to the power port 2222. Preferably, the output port 2121 and the power port 2222 are a plug and a socket of a pair of electrical connector, respectively. That is, the power port 2222 is adapted to connecting the output port 2121. When the power port 2222 is connected to the output port 2121, the electricity of the battery 214 in the power supplying box 212 flows through the output port 2121, the conducting wire 224 and the power port 2222 in order and is transferred to the power unit 12 to be distributed to each module and unit in need in the main body 1.

Since the luggage 1000 may encounter bumps due to a rough floor during moving, and the connection between the power supplying unit 21 and the connecting unit 22 is thus loose. To overcome this situation, the power supplying module 2 has a function of holding the power supplying unit 21. When the power port 2222 is connected to the output port 2121, the holding part 226 abuts against the power supplying box 212 to hold the power supplying unit 21. Specifically, a concaved portion 2124 is formed on the power supplying box 212 in the embodiment, and the holding part 226 comprises a chuck 2262. The chuck 2262 is pivoted to the connecting part 222. When the power port 2222 is connected to the output port 2121, the chuck 2262 clamps the concaved portion 2124 to hold the power supplying unit 21, so the power supplying unit 21 will not break away from the connecting unit 22 due to the bump encountered by the luggage 1000 during moving. A risk of a halt of power supplying is therefore prevented. Additionally, the holding part 226 in the embodiment further comprises an elastic member 2264. The elastic member 2264, which is a torsion spring or other component capable of accumulating elastic force, is disposed between the chuck 2262 and the connecting part 222 to enhance the clamping force for the chuck 2262 to hold the concaved portion 2124. When the user needs to connect the power port 2222 to the output port 2121, he or she can operate a side of the holding part 226 opposite to the chuck 2262 to create a clearance between the chuck 2262 and the connecting part 222. At this time, the elastic member 2264 is compressed and accumulates an elastic force. After the power port 2222 is connected to the output port 2121, the user can release the holding part 226 such that the elastic force accumulated by the elastic member 2264 is exerted on the chuck 2262. The chuck 2262 thus clamps the concaved portion 2124, and the holding part 226 is capable of holding the power supplying unit 21 more steadily.

On the other hand, the power supplying box 212 further has an input port 2122 and an auxiliary port 2123, and the input port 2122 and the auxiliary port 2123 are electrically connected to the battery 214. Specifically, when the electricity of the battery 214 inside the power supplying unit 21 is low, the user can electrically connects the input port 2122 to an external power source. The battery 214 in the power supplying box 212 is thus charged by the external power source. Besides, the auxiliary port 2123 is a universal serial bus port in the embodiment and configured to be electrically connected to a portable device 2000 to charge the portable device 2000. However, the auxiliary port 2123 can also be a 30 pin port, a lightning port or an input/output port of other types. Preferably, the user can electrically connect the power supplying unit 21 to an auxiliary computing device 3000 by the auxiliary port 2123. The auxiliary computing device 3000 can be a device with a microprocessor such as a computer, a smart portable electric device. By electrically connecting the auxiliary port 2123 to the auxiliary computing device 3000, a complicated program with huge information can be computed by the auxiliary computing device 3000, and the computed result is transferred back to the main body 1 and the control unit 13 through the auxiliary port 2123 s as to reduce a calculating burden of the control unit 13.

Additionally, the power supplying box 212 further comprises a plurality of cover portions 2125. The cover portions 2125 are movably connected to the power supplying box 212 and cover the input port 2122 and the auxiliary port 2123. When the input port 2122 is not connected to the external power source, or the auxiliary port 2123 is not connected to the portable device 2000 or the auxiliary computing device 3000, the cover portions 2125 are capable of preventing external dust from entering the input port 2122 and the auxiliary port 2123. A risk of a short cut due to defective contact is thus avoided. Besides, according to a preferable embodiment, a switch 2126 and an indication unit 2127 are disposed on the power supplying box 212. When the user electrically connects the auxiliary port 2123 to the portable device 2000 or the auxiliary computing device 3000, he or she can determine whether the devices are charged by operating the switch 2126. Besides, a charging situation or the current electricity of the battery 214 inside the power supplying box 212 can be known through a signal displayed by the indication unit 2127.

Refer to FIG. 2 and FIG. 4 to FIG. 6 again. In the embodiment, the connecting unit 22 further comprises a locking part 228, and the main body 1 further comprises a wall W. The conducting wire 224 passes through the locking part 228 and is fixed on the wall W by the locking part 228. Specifically, as shown in FIG. 4 and FIG. 5, the locking part 228 comprises a locking housing 2282 and at least one locking member 2284. The locking housing 2282 is a hollow component, so the conducting wire 224 can pass through it. The locking member 2284 is, for example, a screw or a bolt and inbuilt in the locking housing 2282. Therefore, the locking member 2284 is hidden in the back view to enhance the appearance of the locking part 228. When the power supplying module 2 is used, the locking housing 2282 is fixed on the wall W through the locking member 2284 inbuilt therein. Since the conducting wire 224 passes through the locking housing 2282, it is fixed on the wall W simultaneously. The effect of the bump due to the rough road on the luggage 1000 and the power supplying module 2 is further decreased.

Figure 9:
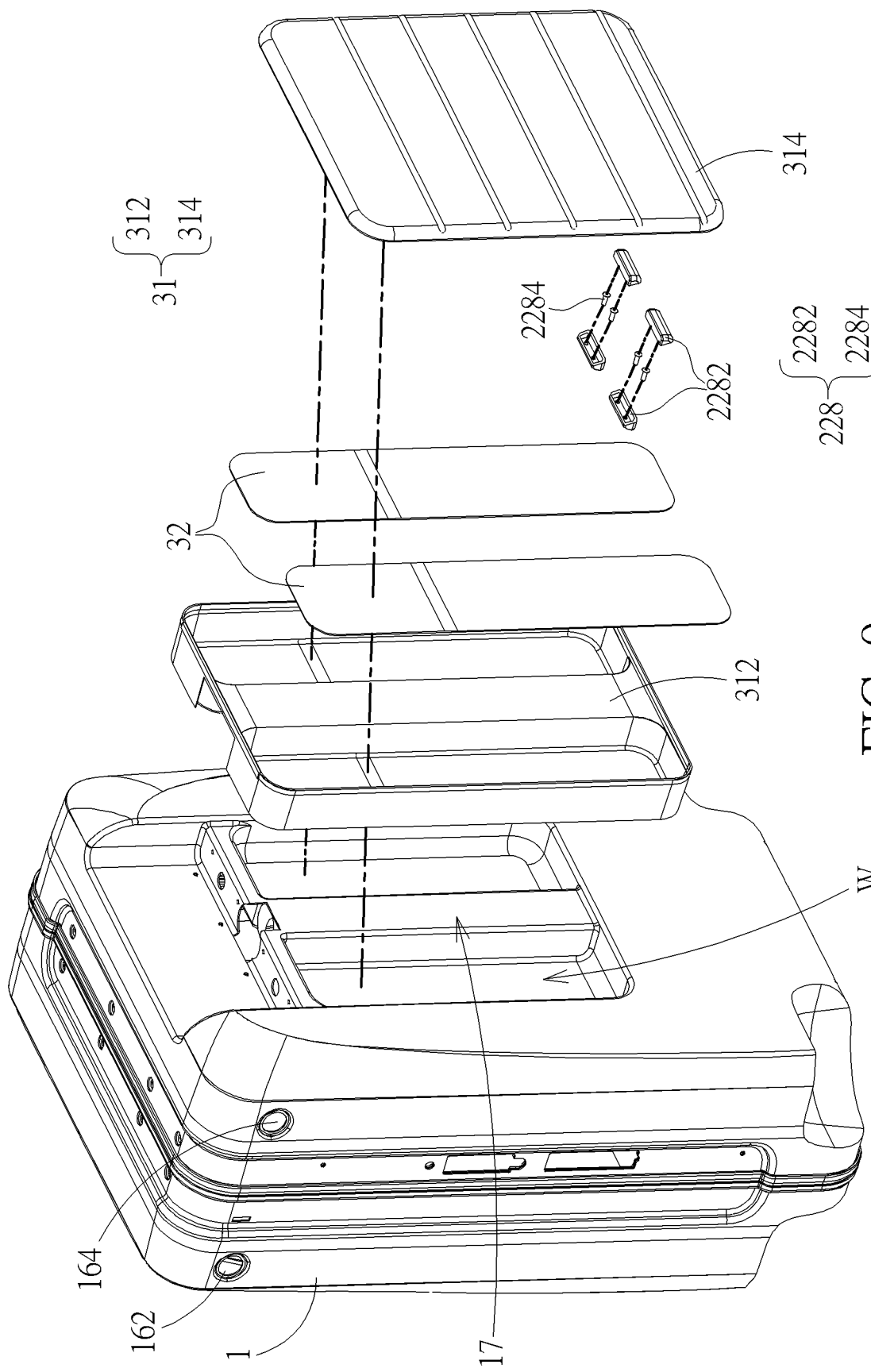
FIG. 9 is a partial exploded diagram of the luggage in FIG. 1.

FIG. 9 is a partial exploded diagram of the luggage in FIG. 1. Please refer to FIG. 2 and FIG. 9. In the embodiment, the luggage 1000 further comprises a storage bag 3. The storage bag 3 is attached to the main body 1, and the power supplying module 2 is disposed in the storage bag 3. Specifically, the storage bag 3 comprises a bag body 31 and at least one fixing member 32. The bag body 31 comprises a first bag portion 312 and a second bag portion 314, and the second bag portion 314 is openably connected to the first bag portion 312. The fixing member 32 is disposed on the bag body 31, and a rigidity of the fixing member 32 is greater than a rigidity of the bag body 31. Specifically, the fixing member 32 is sheet-shaped. During mounting, the user can attach the storage bag 3 on the wall W of the main body 1 first, press the fixing member 32 to the wall W, and fix the fixing member by screws or bolts. Since the rigidity of the fixing member 32 is greater than the one of the storage bag 3, a fixing plane is therefore provided for the screws or bolts. After the storage bag 3 is fixed on the wall W through the fixing member 32, a half of locking housing 2282 can be mounted to the fixing member 32 through the locking member 2284, and the conducting wire 224 passes through the corresponding through-hole disposed on the locking housing 2282. Finally, the other half of the locking housing 2282 adheres to the half of the locking housing 2282 fixed on the fixing member 32 by viscose. Thereby, not only the power supplying unit 21 can be taken out and charged by the external power source instantly when the electricity of the power supplying module 2 runs out, but the portable device 2000 or the auxiliary computing device 3000 of the user can be accommodated in the storage bag 3 when electrically connected to the power supplying module 2. Both hands of the user can be spared without holding the portable device 2000 or the auxiliary computing device 3000.

Refer to FIG. 3 again. According to a preferable embodiment, the main body 1 further comprises an indication module 14. The indication module 14 is electrically connected to the power unit 12 and the control unit 13, and configured to announce the user when the electricity of the power supplying unit 21 is low. Specifically, the indication module 14 comprises an alarm unit 142 and a communication unit 144, and the communication unit 144 is configured to be electrically connected to a wearable device 4000 worn on the user in a wired or a wireless manner. In the embodiment, the alarm unit 142 is a LED, and the wearable device 4000 is a smart watch or a smart wristband, but the present invention is not limited thereto specific components. When the electricity of the battery 214 of the power supplying unit 21 is lower than a predetermined threshold set in advance, e.g. 5%, the control unit 13 transmits a signal to the indication module 14 to activate the alarm unit 142 to raise an alarm to announce the user that the electricity of the battery 214 is going to run out. Otherwise, the control unit 13 controls the communication unit 144 to send out a signal to the wearable device 4000 to activate the alarm unit 142 of the wearable device 4000 to raise the alarm. It is noted that the indication module 14 is not required to comprise both the alarm unit 142 and the communication unit 144, simultaneously. The user can merely dispose the alarm unit 142 or merely dispose the communication unit 144 in the indication module 14 based on preferable an announcing way.

Figure 10:
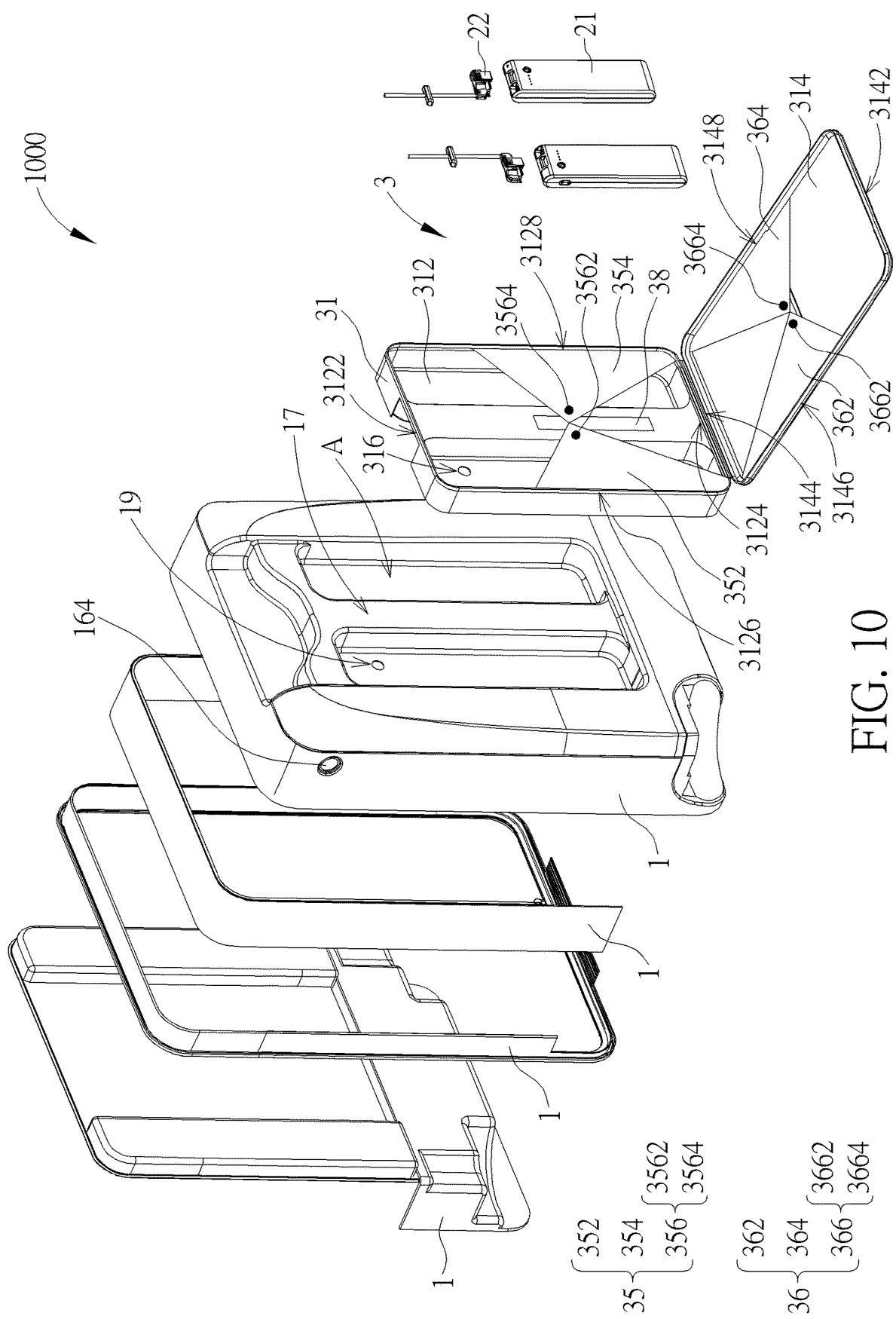
FIG. 10 is an exploded diagram of a piece of luggage according to another embodiment of the present invention.

To prevent the power supplying module 2, the portable device 2000 or the auxiliary computing device 3000 accommodated in the storage bag 3 from dropping out of the storage bag 3 when the storage bag 3 is opened, the present invention provides another type of luggage 1000. FIG. 10 is an exploded diagram of a piece of luggage according to another embodiment of the present invention. The luggage 1000 in FIG. 10 is similar to the luggage 1000 in FIG. 9, and a major difference is that the storage bag 3 in FIG. 10 further comprises a first inner lining part 35 and a second inner lining part 36. The first inner lining part 35 is fixed to the first bag portion 312 and comprises a first connecting feature 356. The first connecting feature 356 comprises a first connecting part 3562 and a second connecting part 3564. On the other hand, the second inner lining part 36 is fixed to the second bag portion 314 and comprises a second connecting feature 366. The second connecting feature 366 is corresponding to the first connecting feature 356 and comprises a third connecting part 3662 and a fourth connecting part 3664. In the embodiment, the first inner lining part 35 and the second inner lining part 36 are made of cloth. The first connecting part 3562 and the second connecting part 3564 are concaved portions of a button, and the third connecting part 3662 and the fourth connecting part 3664 are corresponding protruding portions of the button. The first connecting part 3562, the second connecting part 3564, the third connecting part 3662 and the fourth connecting part 3664 are respectively sewed on the first inner lining part 35 and the second inner lining part 36. When using the storage bag 3, the user can fasten the first connecting part 3562 to the third connecting part 3662, and fasten the second connecting part 3564 to the fourth connecting part 3664 to connect the first inner lining part 35 to the second inner lining part 36 through the first connecting feature 356 and the second connecting feature 366. Besides, a hole 19 and a hole 316 are respectively disposed on the main body 1 and the first bag portion 312 to allow the conducting wire 224 to pass through.

Figure 11:
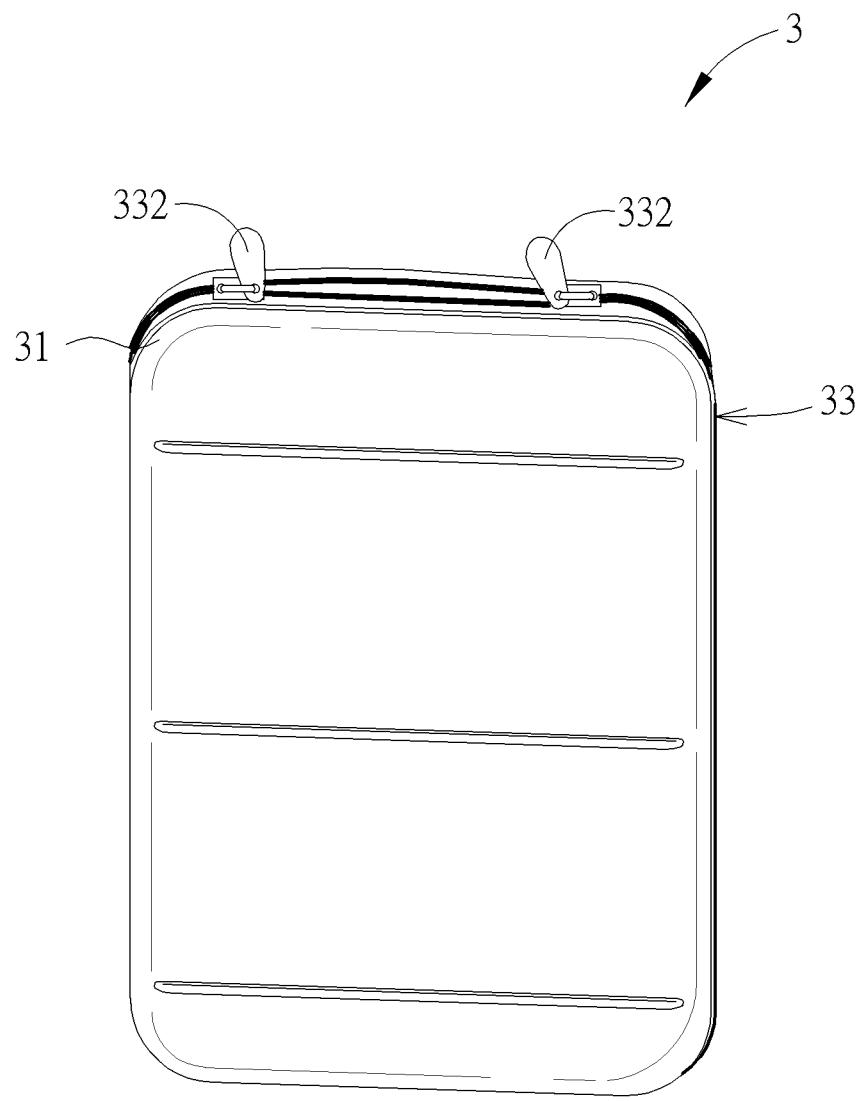
FIG. 11 is a perspective diagram of the storage bag in FIG. 10.

FIG. 11 is a perspective diagram of the storage bag in FIG. 10. Please refer to FIG. 10 and FIG. 11. Specifically, the first bag portion 312 comprises a first top edge 3122, a first bottom edge 3124, a first side edge 3126 and a second side edge 3128. The first side edge 3126 and the second side edge 3128 are both adjacent to the first top edge 3122 and the first bottom edge 3124. The second bag portion 314 comprises a second top edge 3142, a second bottom edge 3144, a third side edge 3146 and a fourth side edge 3148. The third side edge 3146 and the fourth side edge 3148 are both adjacent to the second top edge 3142 and the second bottom edge 3144. The first bottom edge 3124 is fixed to the second bottom edge 3144. A zipper 33 is disposed on the first top edge 3122, the first side edge 3126, the second side edge 3128, the second top edge 3142, the third side edge 3146 and the fourth side edge 3148, and the second bag portion 314 is selectively connected to the first bag portion 312 through the zipper 33. In addition, as shown in FIG. 11, the zipper 33 comprises at least one zipper slider 332. In the embodiment, there are two zipper slider 332. According to the arrangement, the user is able to make the second bag portion 314 partially or entirely opened relative to the first bag portion 312 through the zipper 33 as the first bottom edge 3124 is connected to the second bottom edge 3144.

Figure 12:
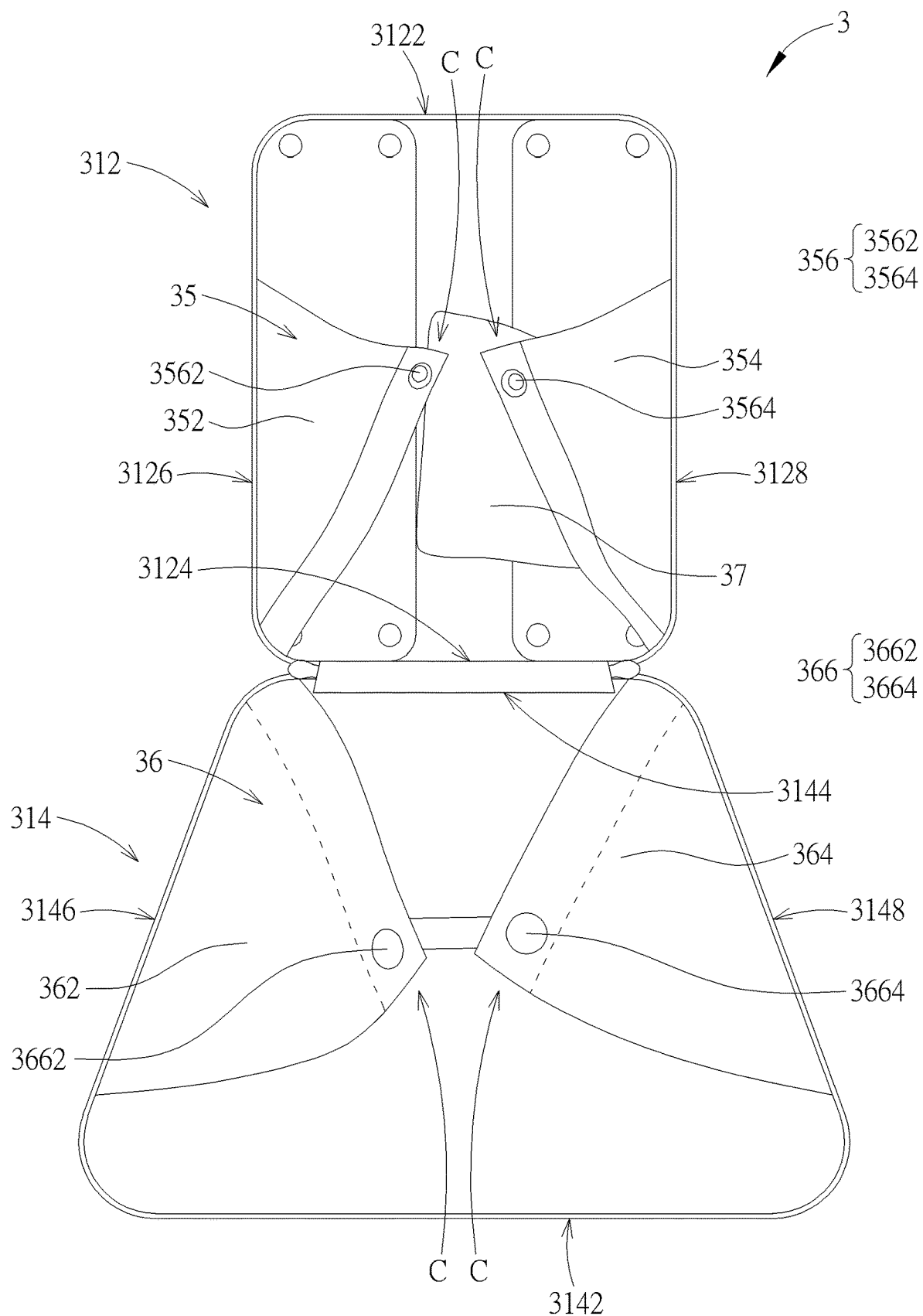
FIG. 12 is a perspective diagram of the storage bag in FIG. 10 in an open state.
Figure 13:
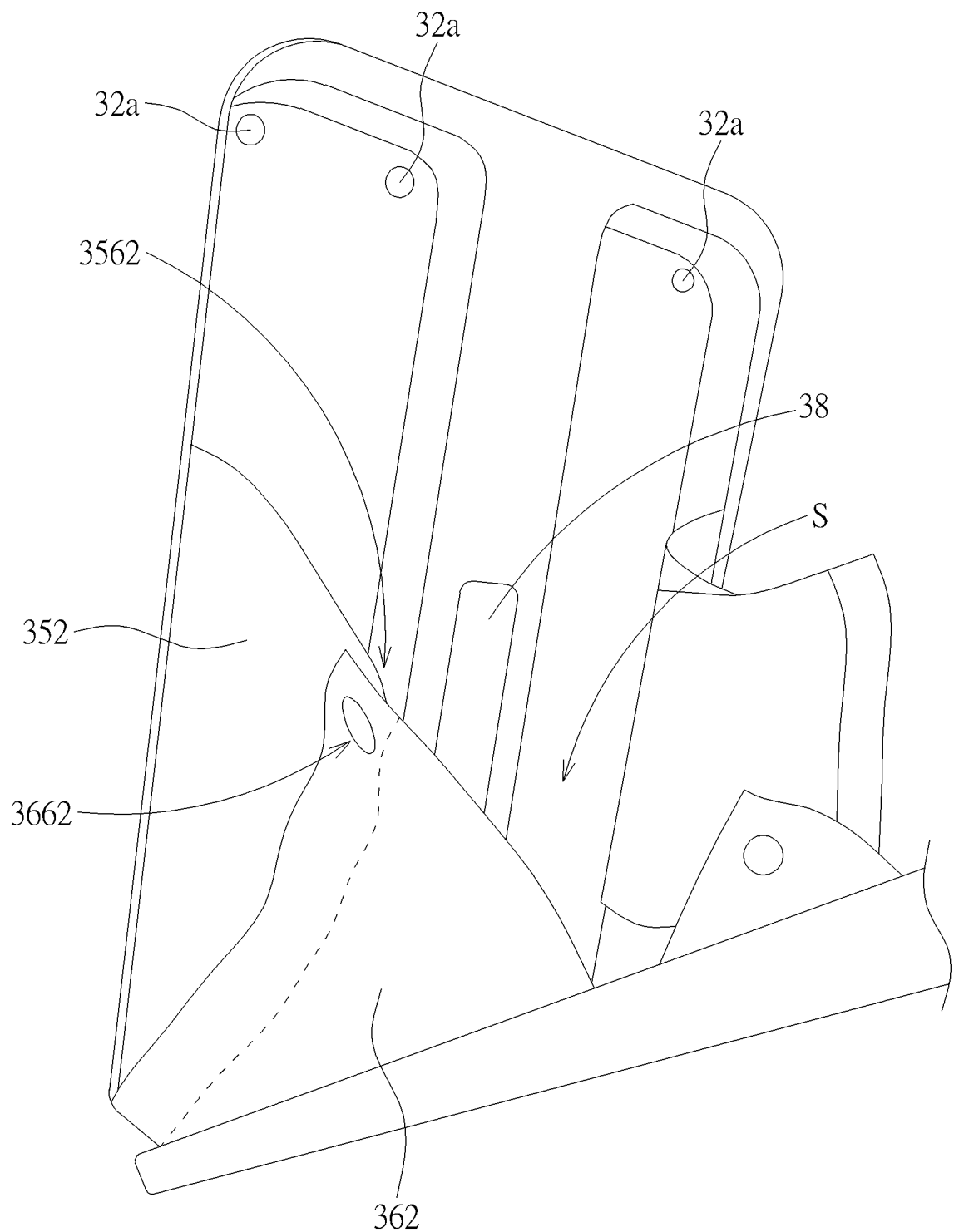
FIG. 13 is a perspective diagram showing how the first connecting feature connects the second connecting feature.

FIG. 12 is a perspective diagram of the storage bag in FIG. 10 in an open state. FIG. 13 is a perspective diagram showing how the first connecting feature connects the second connecting feature. Please refer to FIG. 12 and FIG. 13. In the embodiment, the first bag portion 312 of the bag body 31 is made from a polymer such as EVA (Ethylene Vinyl Acetate), or other material with high plasticity and high rigidity after formalization. During manufacturing, the material makes the installation of the storage bag 3 to the main body 1 easier. The material for the second bag portion 314, e.g. PC, is harder than the material for the first bag portion 312. That is, the first bag portion 312, which faces the main body 1, is made by EVA, and the second bag portion 314, which is away from the main body 1, is made by PC. Thereby, the bag body 31 composed by two different materials can satisfy needs of both mass producing and rigidity. Besides, the luggage 1000 further comprises a plurality of fixing members 32a, and the fixing members 32a can be bolts, screws or other elements with a fixing function. The user is able to attach the storage bag 3 in an accommodating space A formed on the main body 1, and fix the bag body 31 on the wall W of the main body 1 through the fixing members 32a. On the other hand, the first inner lining part 35 comprises a first side edge inner lining 352 and a second side edge inner lining 354, and the second inner lining part 36 comprises a third side edge inner lining 362 and a fourth side edge inner lining 364. The first side edge inner lining 352, the second side edge inner lining 354, the third side edge inner lining 362 and the fourth side edge inner lining 364 are respectively fixed to the first side edge 3126, the second side edge 3128, the third side edge 3146 and the fourth side edge 3148. Besides, the first side edge inner lining 352, the second side edge inner lining 354, the third side edge inner lining 362 and the fourth side edge inner lining 364 has a corner portion C, respectively. The first connecting part 3562, the second connecting part 3564, the third connecting part 3662 and the fourth connecting part 3664 are disposed on the corner portions C of the first side edge inner lining 352, the second side edge inner lining 354, the third side edge inner lining 362 and the fourth side edge inner lining 364. Thereby, as shown in FIG. 13, when the second bag portion 314 is opened relative to the first bag portion 312 and the first inner lining part 35 is connected to the second inner lining part 36 through the first connecting feature 356 and the second connecting feature 366, the first side edge inner lining 352 is connected to the third side edge inner lining 362, and the second side edge inner lining 354 is connected to the fourth side edge inner lining 364. Therefore, the first bag portion 312, the first inner lining part 35, the second bag portion 314 and the second inner lining part 36 are capable of cooperatively defining a storage space S. According to the arrangement, the user can put stuff in the storage bag 3, and a side wall formed by the first inner lining part 35 and the second inner lining part 36 can prevent the stuff from dropping out when the storage bag 3 is opened. That is, the stuff can be accommodated in the storage space S safely.

Figure 14:
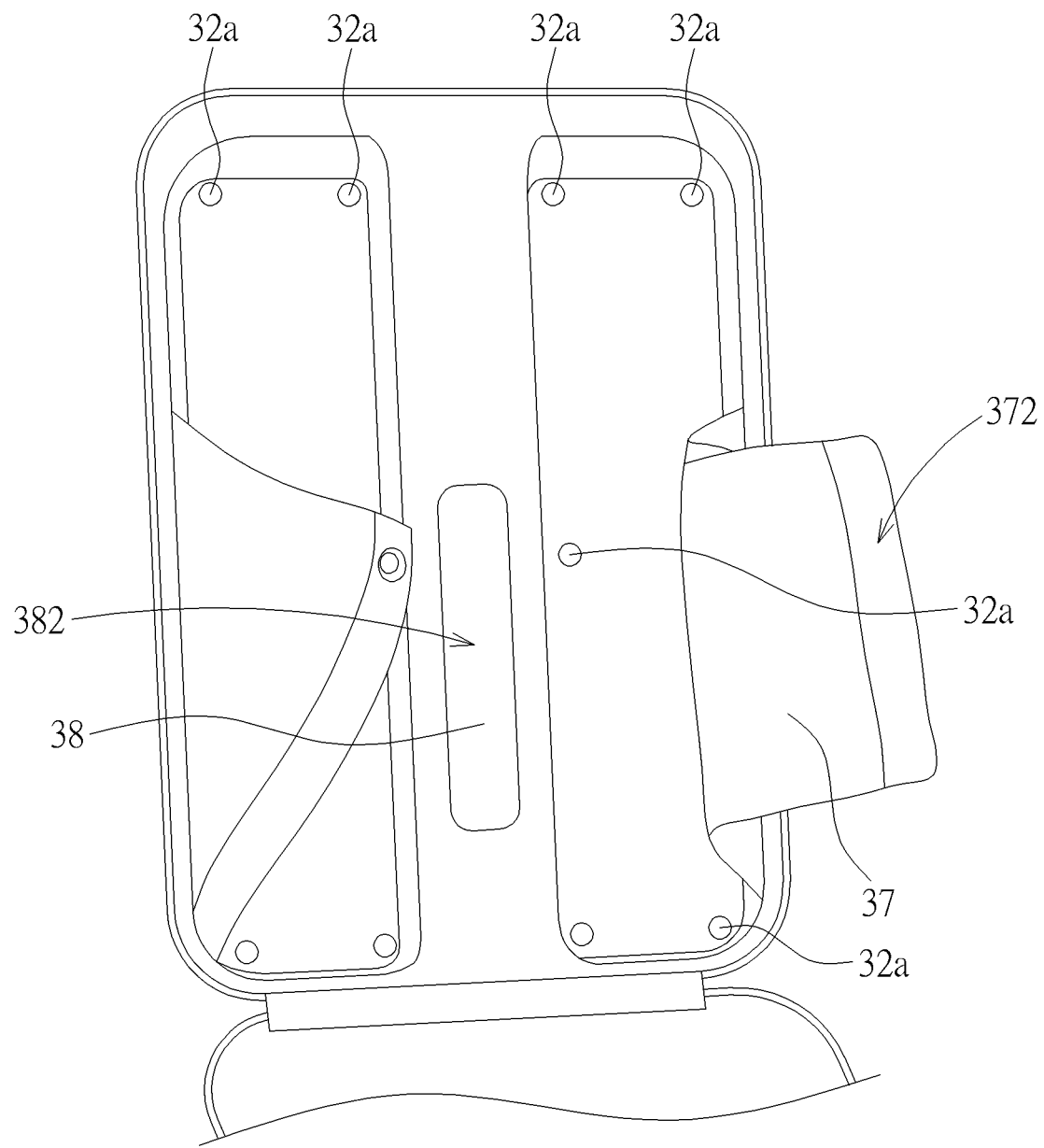
FIG. 14 is a perspective diagram showing an auxiliary inner lining part and an auxiliary connecting part on the storage bag.

Besides, if there is any important item needed to be put in the storage bag 3 and fixed at a specific position, the present invention also provides a corresponding solution. FIG. 14 is a perspective diagram showing an auxiliary inner lining part and an auxiliary connecting part on the storage bag. Please refer to FIG. 14. The main body 1 further comprises a rib portion 17, and the rib portion 17 is located at a central position of the main body 1 and divides the storage space S into two similar subspaces. The storage bag 3 further comprises an auxiliary inner lining part 37 and an auxiliary connecting part 38. The auxiliary inner lining part 37 is fixed on an edge of the first bag portion 312, for example the inner side of the second side edge 3128. The auxiliary connecting part 38 is disposed to a location on the first bag portion 312 corresponding to the rib portion 17 to connect the auxiliary inner lining part 37. Specifically, the auxiliary inner lining part 37 and the auxiliary connecting part 38 respectively comprise a binding feature 372, 382. The auxiliary connecting part 38 is connected to the binding feature 382 of the auxiliary inner lining part 37 through the binding feature 372. According to the arrangement, when the auxiliary connecting part 38 is connected to the auxiliary inner lining part 37, the subspaces with a height established by the rib portion 17 are constructed in the storage space S, and the important item, e.g. the power supplying unit 21, can be accommodated in the subspaces and surrounded by the first bag portion 312 and the auxiliary inner lining part 37. Therefore, When the storage bag 3 is opened, the important item can be held at the original position rather than spread as a mess.

Figure 15:
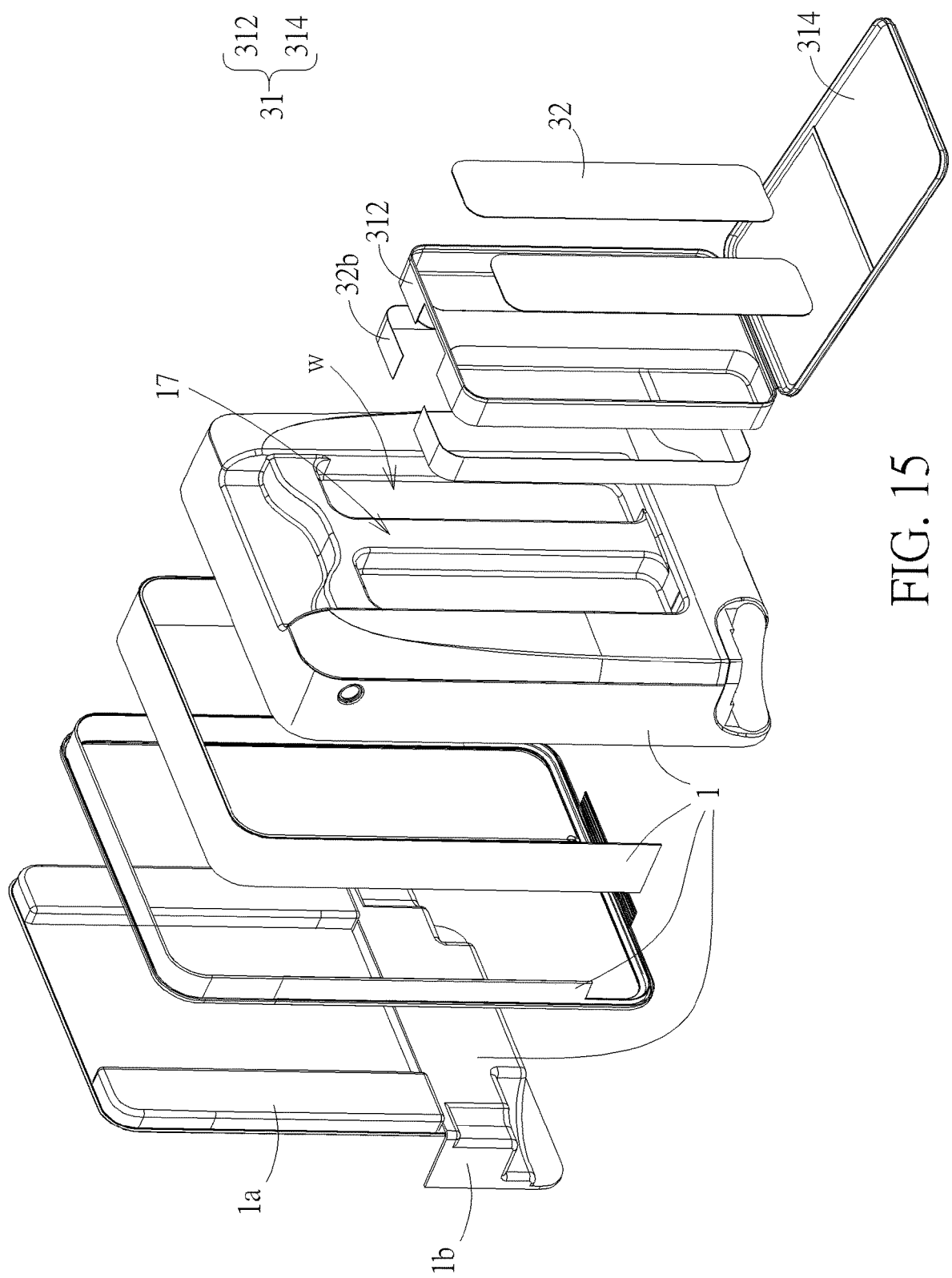
FIG. 15 is an exploded diagram of a piece of luggage according to another embodiment of the present invention.

On the other hand, for the ease of mounting the storage bag 3 on the wall W of the main body 1, the present invention further discloses a piece of luggage 1000 with another type of storage bag 3 to provide an appropriate protection to the components disposed in the main body 1. FIG. 15 is an exploded diagram of a piece of luggage according to another embodiment of the present invention. Please refer to FIG. 15. The luggage 1000 is similar to the luggage 1000 in FIG. 9, and the major difference is that the storage bag 3 further comprises a ring-shaped fixing member 32b besides the sheet-shaped fixing member 32. The bag body 31 is made of cloth, and the fixing member 32b is made from polymer, e.g. PP or PC. That is, the rigidity of the fixing member 32b is greater than the rigidity of the bag body 31. Since the bag body 31 made of cloth is soft and difficult to be fixed on the main body 1 directly. The fixing member 32b is designed to corresponding at least a portion of the accommodating space A and sewed onto the bag body 31. Thus the storage bag 3 has a harder periphery for bolts or screws to pass through or for viscose to paste. Therefore, the storage bag 3 can be fixed to the luggage 1000 easier.

Figure 16:
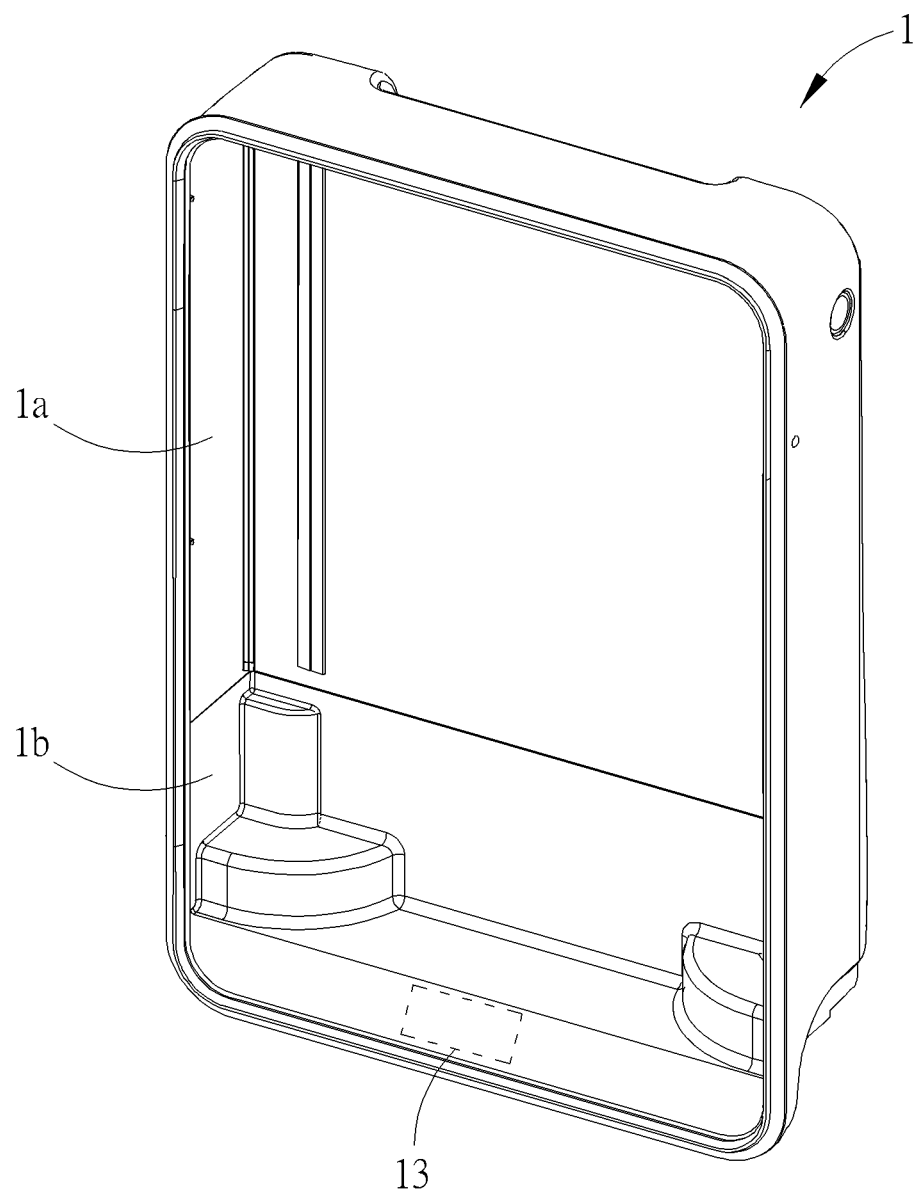
FIG. 16 is a back view of the main body in FIG. 15.

FIG. 16 is a back view of the main body in FIG. 15. Please refer to FIG. 16. Since the main motor 112 and the power unit 12 are delicate electric components. To prevent these electric components from damage when the items put inside the main body 1 are overweight, the main body 1 comprises a first portion 1a and a second portion 1b. The first portion 1a is an upper half of the main body 1 and has inside soft cloth to comply with the inner item disposed in the main body 1. The second portion 1b is a lower half of the main body 1. Besides the inside soft cloth, the material of the second portion 1b is a harder polymer such as EVA. The first portion 1a is connected to the second portion 1b through sewing. Specifically, when items are put in the main body 1, the power unit 12 and the main motor 112 are disposed in the second portion 1b. Since the rigidity of the second portion 1b is greater than the rigidity of the first portion 1a, even if the first portion 1a deforms due to complying with the impact of the inner items when the luggage 1000 moves, the delicate components such as the power unit 12, the main motor 112 and the active wheel 1112 can be protected by the second portion 1b from damage.

Figure 17:
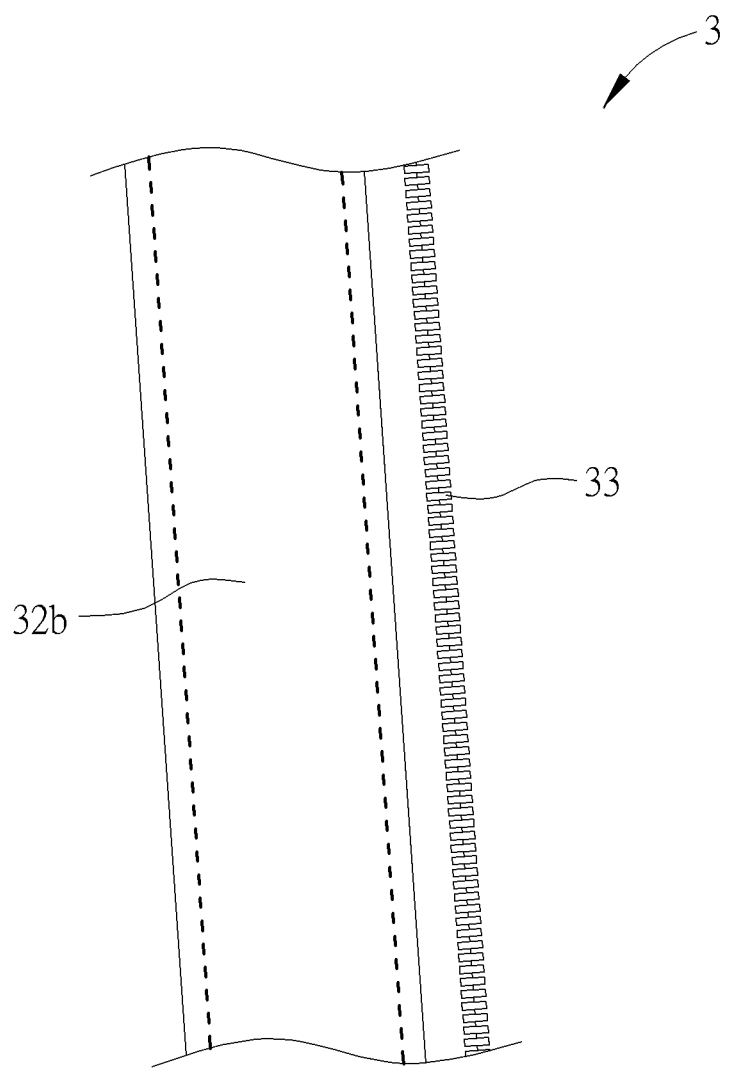
FIG. 17 is a partial view of the storage bag in FIG. 15.
Figure 18:
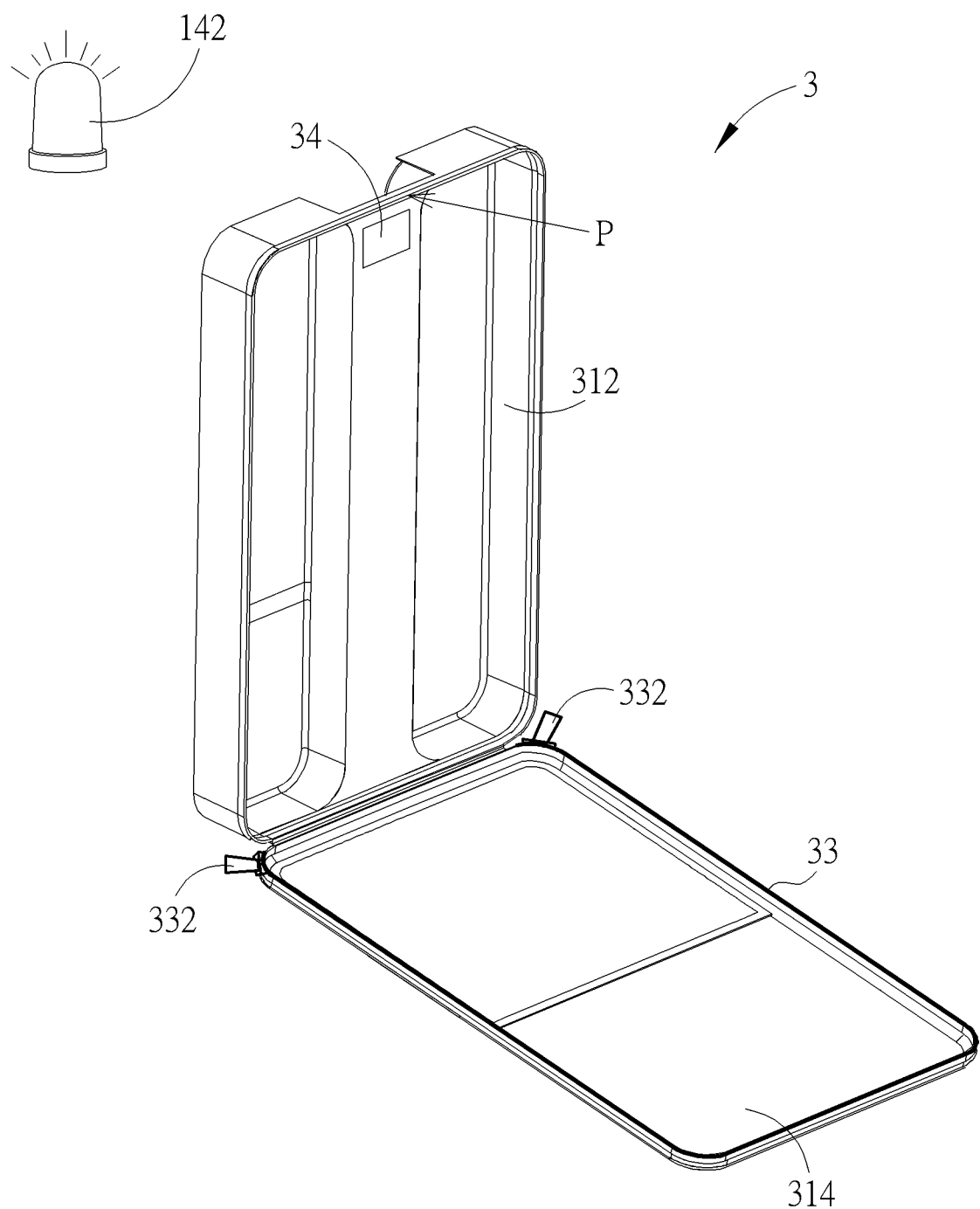
FIG. 18 is a perspective diagram of the storage bag in FIG. 15 in an open state.

FIG. 17 is a partial view of the storage bag in FIG. 15. FIG. 18 is a perspective diagram of the storage bag in FIG. 15 in an open state. Please refer to FIG. 17 and FIG. 18. In the embodiment, the fixing member 32b is wrapped by a leather or cloth so as to be sewed on an outer surface near the opening of the bag body 31. Besides, two sewing lines are parallel to the zipper 33, so the appearance is enhanced. On the other hand, to prevent the inner items from dropping out from the bag body 31 when the luggage 1000 moves, the storage bag 3 further comprises a transducer 34. The transducer 34 is disposed on the bag body 31 and electrically connected to the power unit 12 and the control unit 13. Specifically, as shown in FIG. 17, the transducer 34 in the embodiment is a hall sensor capable of detecting whether the zipper slider 332 of the zipper 33 is located at a predetermined position P, a position the zipper slider 332 moves to when the bag body 31 closes. In addition, the zipper slider 332 comprise a magnetic material or a magnet, and the transducer 34 is capable of sensing a magnitude of the magnetic field and the variation thereof due to changing of the position of the zipper slider 332 to determine whether the zipper slider 332 is located at the predetermined position P. When at least one wheel 111 of the plurality of wheels 111 is rolling on a floor and the transducer 34 does not detect the zipper slider 332 locating at the predetermined position P, the control unit 13 sends out a command to the moving module 11 to control the main motor 112 to stop operating. Therefore, the luggage 1000 does not moves anymore to reduce a risk of dropping out of the items in the bag body 31. According to a preferable embodiment, if the transducer 34 senses a variation of the magnetic field exceeding a predetermined range, the transducer 34 will ignore the variation to avoid being interfered by other magnetic substances.

Besides, the warning function corresponding to detecting the incomplete closing of the bag body 31 can be also integrated into the indication module 14. When at least one wheel 111 of the wheels 111 is rolling on the floor and the transducer 34 does not detect the zipper slider 332 locating at the predetermined position P, the control unit 13 controls the indication module 14 to activate the alarm unit 142 to raise the alarm. It is noted that the function of stopping operating of the main motor 112 and activating the alarm unit 142 by the control unit 13 can be utilized simultaneously. The user can close the storage bag 3 on the stationary luggage 1000 when receiving the alarm. According to a preferable embodiment, the alarm unit 142 is design as a software and integrated in the portable device 2000 or the wearable device 4000. The software can generate a vibration to announce the user that the bag body 31 is not closed completely. The vibration mode can be differ from modes when a smart phone receives a call or a message since the software is able to recognize the receiving calling vibration mode and the receiving message vibration mode and set another vibration mode differing from the modes mentioned.

Figure 19:
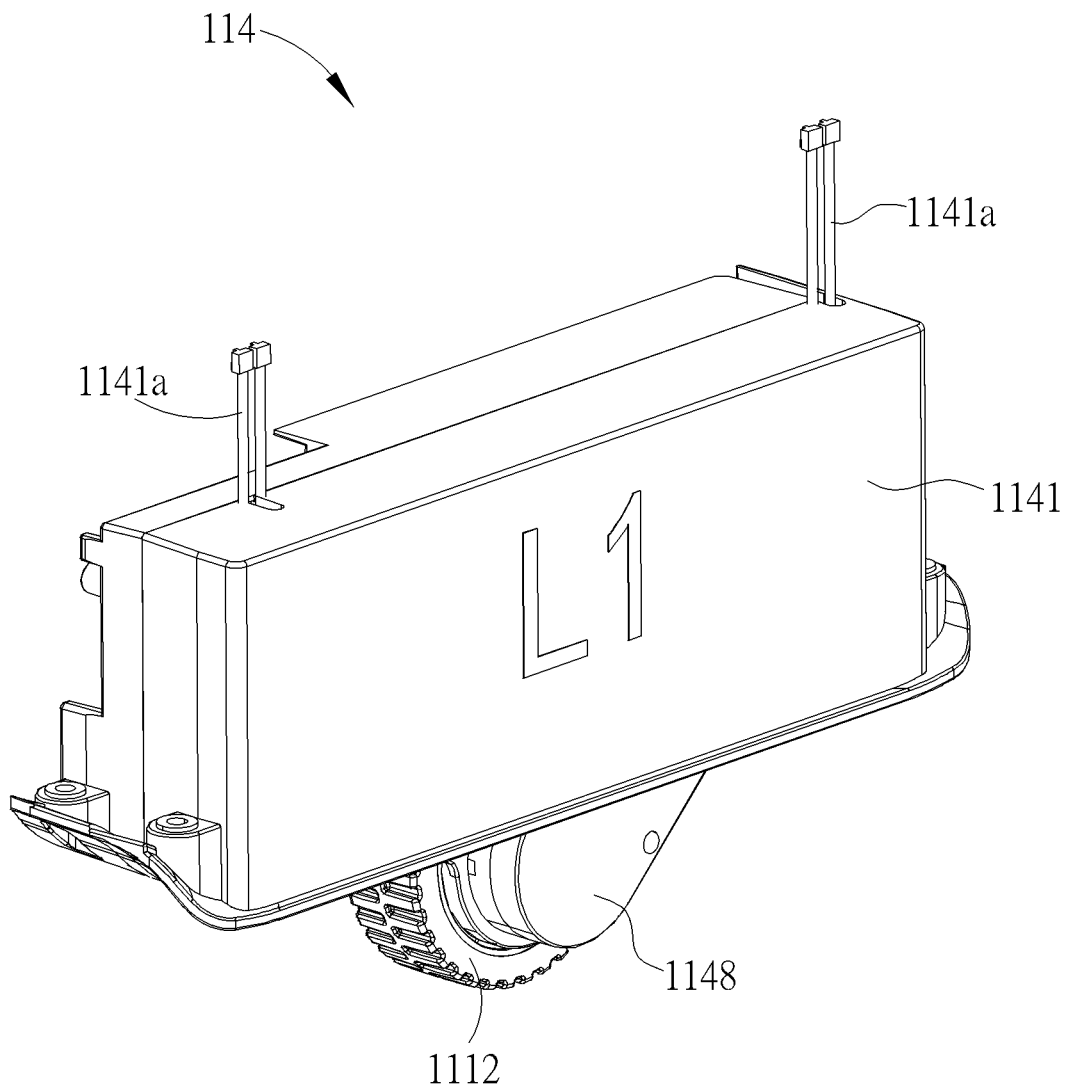
FIG. 19 is a perspective diagram of an elevating mechanism in FIG. 2.
Figure 20:
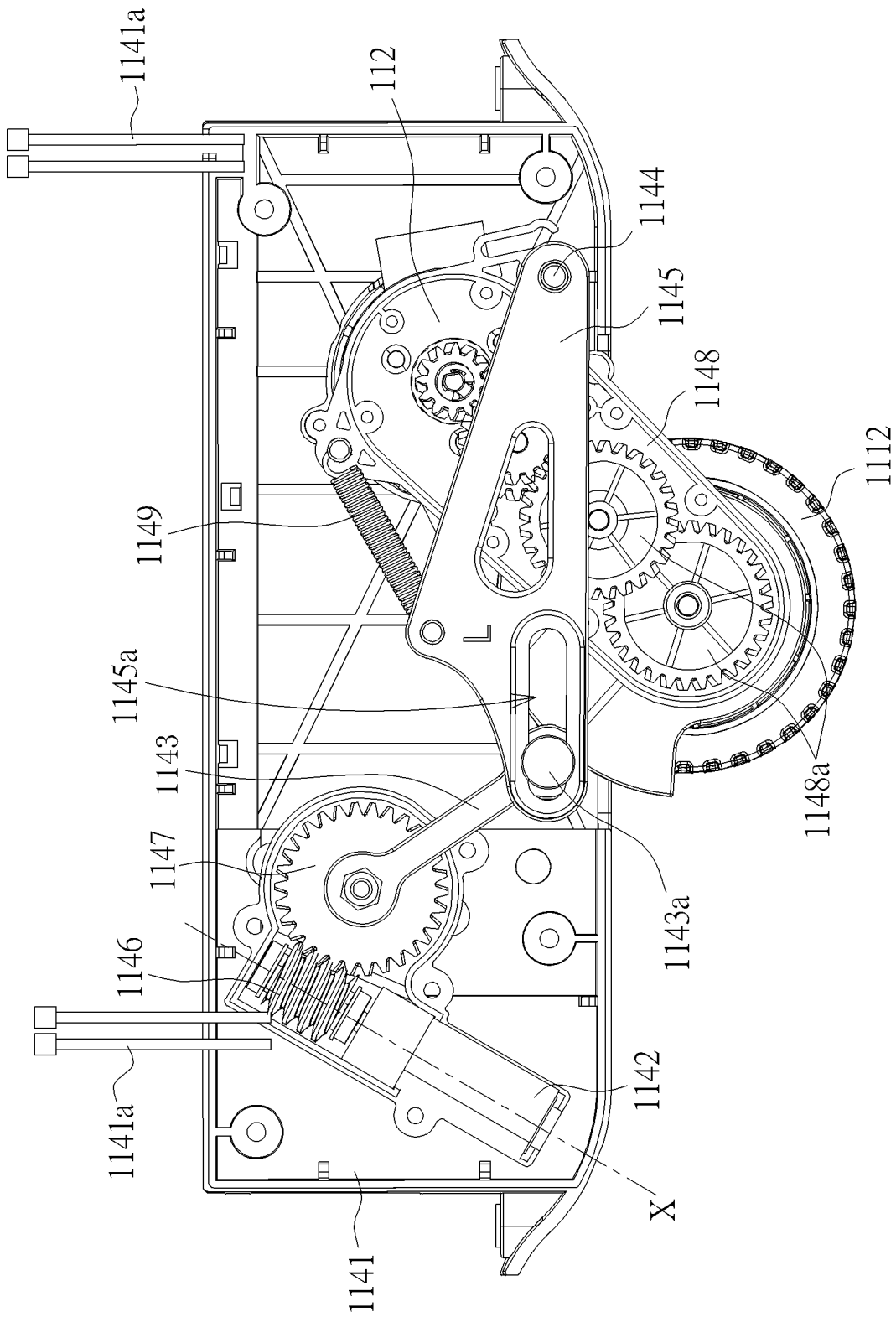
FIG. 20 is a front view of internal components of the elevating mechanism when the active wheel is located at a descending position.

When the electricity of the power unit 12 and the battery 214 in the power supplying unit 21 is running out, if the active wheel 1112 is still located at a moving position, damage may be caused due to direct friction between the floor and the unpowered wheel. Therefore, the moving module 11 of the luggage 1000 further comprises an elevating mechanism 114 disposed in the main body 1 and electrically connected to the power unit 12 and the control unit 13 to solve the problem. FIG. 19 is a perspective diagram of the elevating mechanism in FIG. 2. FIG. 20 is a front view of internal components of the elevating mechanism when the active wheel is located at a descending position. Please refer to FIG. 19 and FIG. 20. The elevating mechanism 114 comprises a housing 1141, an elevating motor 1142, a first link 1143, a pivoting member 1144 and a second link 1145. The elevating motor 1142 is disposed in the housing 1141 and configured to drive the active wheel 1112 to ascend or descend. The first link 1143 is pivoted to the housing 1141 and coupled to the elevating motor 1142. The pivoting member 1144 is connected to the housing 1141. The second link 1145 is pivoted to the housing 1141 through the pivoting member 1144. A center of the active wheel 1112 is fixed relative to the second link 1145, and an end 1143a of the first link 1143 is slidably connected to the second link 1145.

In detail, the housing 1141 has wires 1141a. The wires 1141a are electrically connected to the elevating motor 1142, the control unit 13 and the power unit 12 to transfer the electricity from the power unit 12 to the elevating motor 1142 or to transfer an electric signal or a command from the control unit 13 to the elevating motor 1142 so as to enable the active wheel 1112 to receive a command input by the user manually or the command transmitted by the control unit 13 autonomously to ascend or descend. Besides, the elevating mechanism 114 further comprises a worm 1146 and a worm gear 1147. The elevating motor 1142 is coupled to the worm 1146, and a central axis X of the worm 1146 passes through the elevating motor 1142. In other words, the worm 1146 is a directly-driven worm, which can be driven directly by the elevating motor 1142 without aid of other components. On the other hand, the first link 1143 is fixed to the worm gear 1147, and the worm 1146 is engaged to the worm gear 1147. Therefore, when the elevating motor 1142 drives the worm 1146 to rotate, the worm gear 1147 and the first link 1143 are also driven to rotate relative a center of the worm gear 1147.

Besides, the elevating mechanism 114 further comprise a base 1148 and a damper 1149. The base 1148 is disposed in the housing 1141 and pivoted to the housing 1141 through the pivoting member 1144 to have a synchronous motion with the second link 1145. It is noted that the synchronous motion means that when the elevating mechanism 114 operates, the second link 1145 and the base 1148 share identical physical motional quantities such as displacement and rotation angle. In addition, the active wheel 1112 is pivoted to the base 1148, and the main motor 112 is disposed on the base 1148 to drive the active wheel 1112 to rotate on the floor. Moreover, the main motor 112 is also electrically connected to the control unit 13 and the power unit 12 through the wire 1141a to receive the electricity or the commands from the power unit 12 or the control unit 13. A plurality of gears 1148a are disposed on the base 1148. When the second link 1145 and the active wheel 1112 are revolved to a descending position, the main motor 112 receives the command from the control unit 13 and drives the active wheel 1112 to rotate on the floor through the gears 1148a to move the luggage 1000 autonomously. In the embodiment, the damper 1149 is a tension spring and connected to the second link 1145 and the base 1148. The damper 1149 not only absorbs vibrating energy when the active wheel 1112 encounters bumps but also guides the base 1148 to revolve simultaneously to keep the synchronous motion state with the second link 1145 from an ascending position to the descending position.

In addition, the second link 1145 comprises a slot 1145a, and the end 1143a of the first link 1143 is slidably connected to the slot 1145a. Therefore, when the elevating motor 1142 drives the worm 1146 and the first link 1143 to rotate, due to blocked by the side wall of the slot 1145a, the end 1143a of the first link 1143 is capable of guiding the second link 1145 and the active wheel 1112 to revolve to the descending position through the pivoting member 1144 relative to the housing 1141 in a revolving direction opposite to the first link 1143 so as to make the active wheel 1112 extrude from the housing 1141 and contact the floor. At this time, the end 1143a of the first link 1143 can slide freely in a longitudinal direction of the slot 1145a. According to the arrangement, the elevating mechanism 114 is capable of guiding the active wheel 1112 to ascend or descend between the ascending position and the descending position with a linkage mechanism merely comprising the first link 1143 and the second link 1145.

Figure 21:
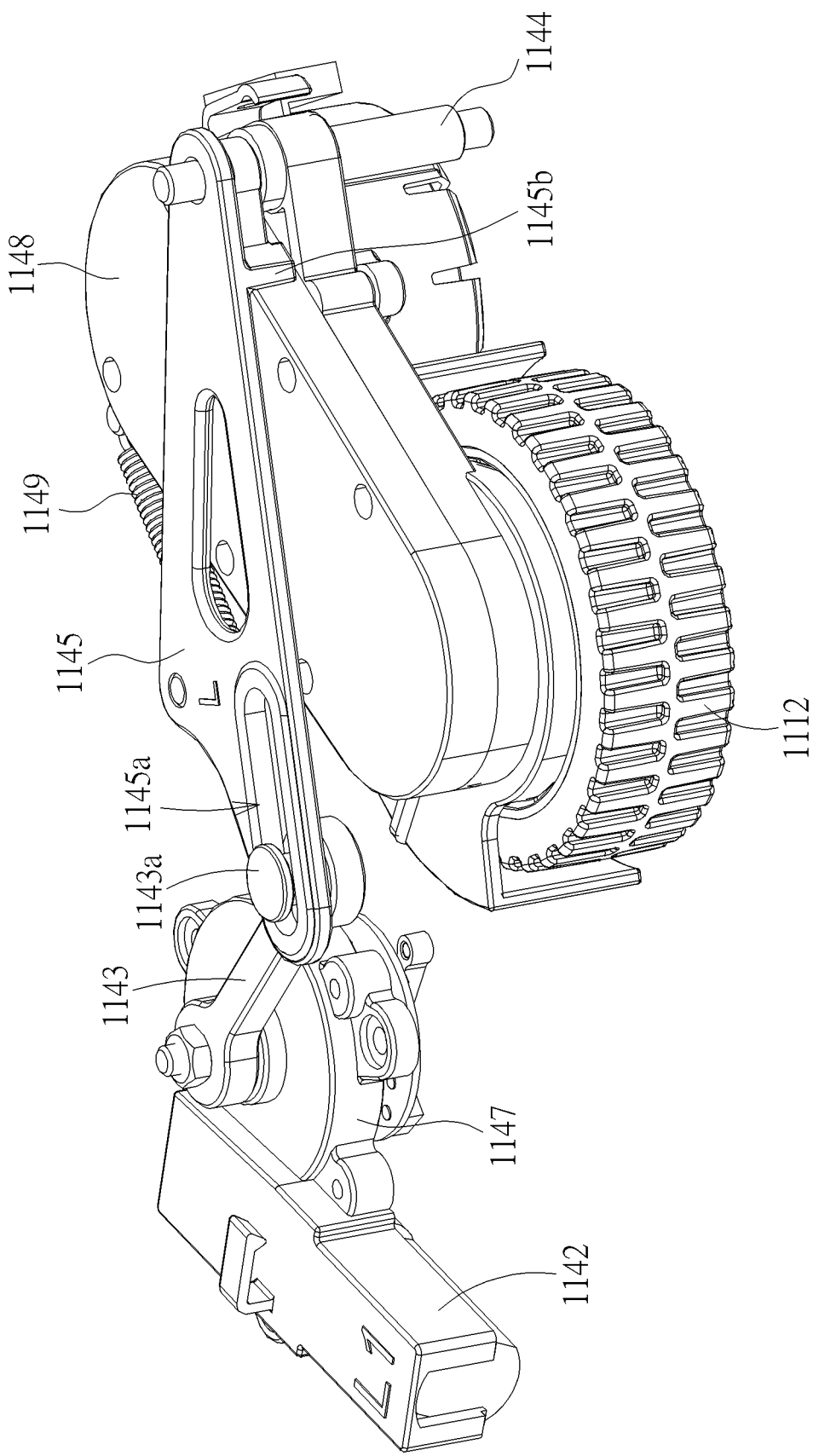
FIG. 21 is a perspective diagram of partial of the internal components of the elevating mechanism from another viewpoint.

FIG. 21 is a perspective diagram of partial of the internal components of the elevating mechanism from another viewpoint. Please refer to FIG. 21. It is noted that the second link 1145 further comprises a limiting portion 1145b. In the embodiment, the limiting portion 1145b is a blocking rib portion. However, it can also be a block or an engaging structure. When the elevating motor 1142 drives the first link 1143 to revolve from the descending position to the ascending position, the base 1148 is limited by the limiting portion 1145b and guided to revolve. On the other hand, when the base 1148 revolves from the ascending position to the descending position, the limiting portion 1145b also restricts the lowest level of the base 1148. Therefore, the synchronous motion of the second link 1145 and the base 1148 can be guaranteed to be continuous by the limiting portion 1145b and the damper 1149.

Figure 22:
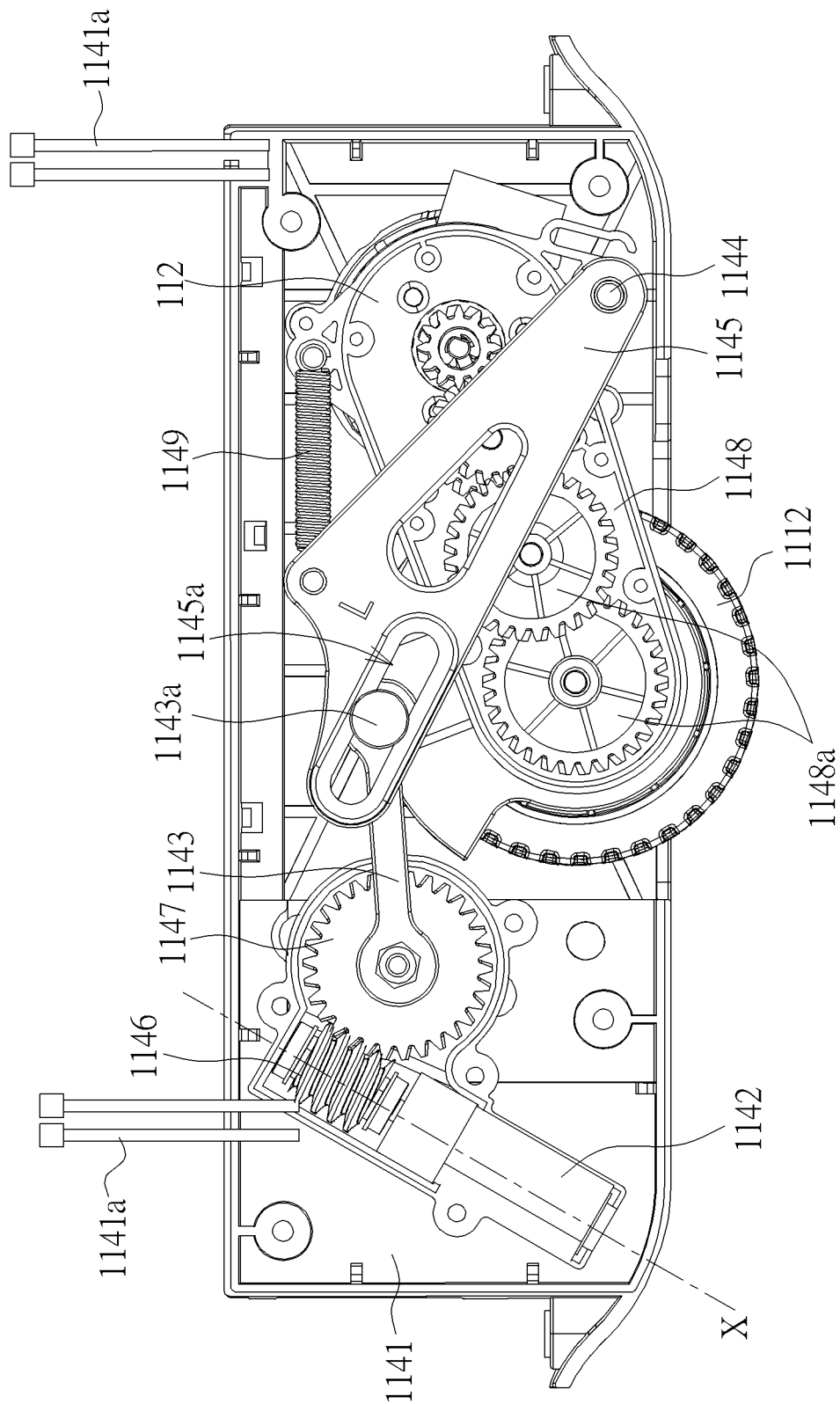
FIG. 22 is a front view of the internal components of the elevating mechanism when the active wheel is located at an ascending position.

FIG. 22 is a front view of the internal components of the elevating mechanism when the active wheel is located at the ascending position. Please refer to FIG. 22. When the electricity of the power unit 12 or the battery 214 of the luggage 1000 is lower than the predetermined threshold, e.g. 5%, the control unit 13 sends out a signal to control the elevating motor 1142 to drive the worm 1146 to rotate, and furthermore drives the worm gear 1147 and the first link 1143 to rotate counterclockwise. At this time, the upper half side wall of the slot 1145a of the second link 1145 is abutted by the end 1143a of the first link 1143 so as to drive the second link 1145 and the active wheel 1112 to revolve to the ascending position. Since the base 1148 has the synchronous motion with the second link 1145, the active wheel 1112 disposed on the base 1148 leaves the floor and a portion of the active wheel 1112 is accommodated in the housing 1141 to prevent the active wheel 1112 from staying on the floor caused by running out of electricity of the power unit 12 or the battery 214. A risk of damage of the active wheel 1112 or the inconveniences for the user to drag the luggage 1000 are thus avoided.

Figure 23:
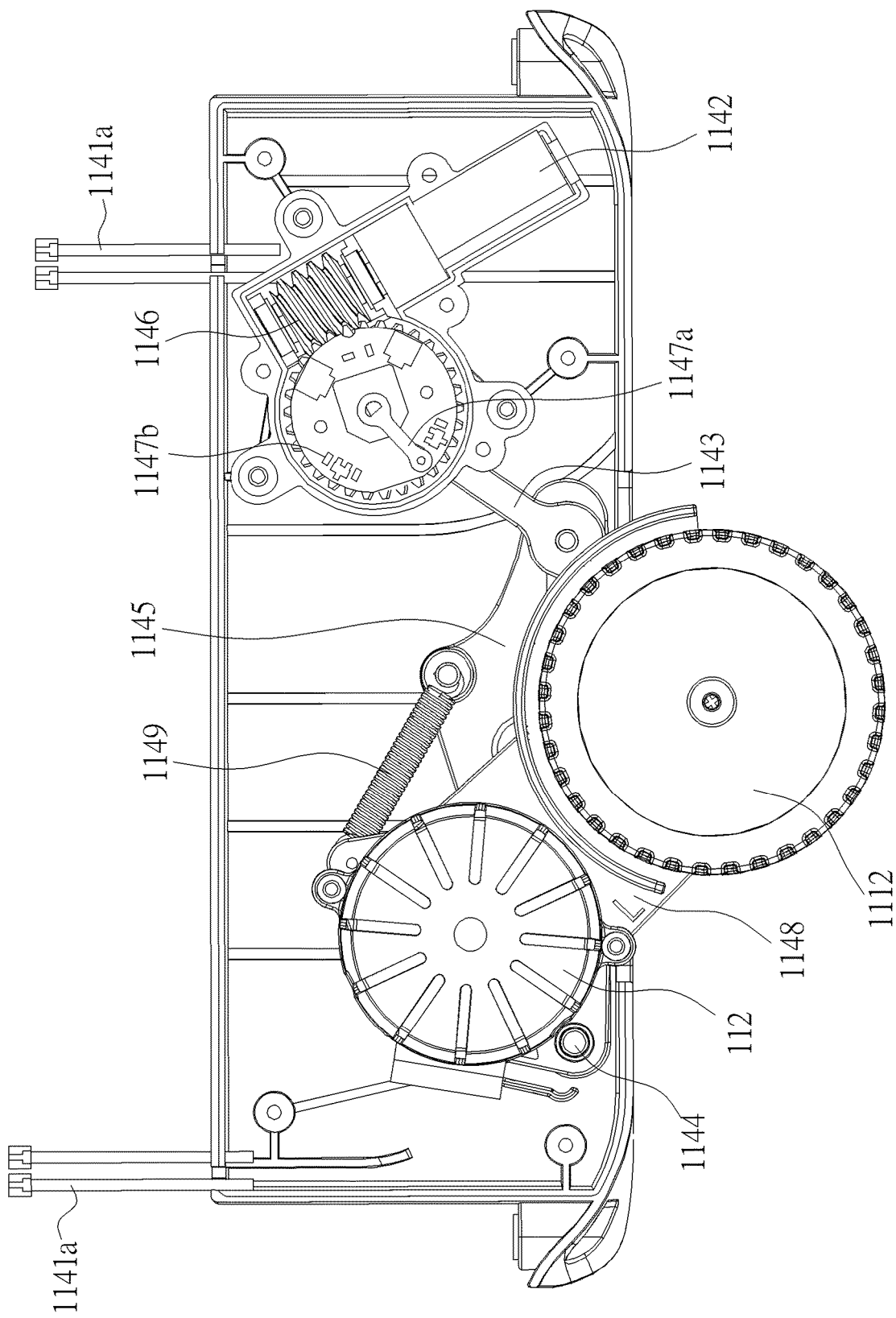
FIG. 23 is a back view the internal components of the elevating mechanism.

FIG. 23 is a back view the internal components of the elevating mechanism. Please refer to FIG. 23. A magnetic member 1147a and a magnetic sensing member 1147b are disposed on the worm gear 1147, and one of the magnetic member 1147a and the magnetic sensing member 1147b is fixed to the worm gear 1147. Specifically, in the embodiment, the magnetic member 1147a is a magnet fixed to the worm gear 1147, and the magnetic sensing member 1147b is a hall sensor and fixed relative to the housing 1141. Therefore, when the elevating motor 1142 drives the worm 1146 to rotate and furthermore drives the worm gear 1147 to rotate, the magnetic member 1147a rotates synchronously with the worm gear 1147. Then a relative angle between the magnetic member 1147a and the magnetic sensing member 1147b changes, the magnetic sensing member 1147b detects the change and transmit the status to the control unit 13. According to the arrangement, the luggage 1000 is capable of getting precise positions and revolving states of the first link 1143, the second link 1145 and the active wheel 1112 in time. In another preferable embodiment, it is noted that the magnetic member 1147a can be fixed relative to the housing 1141, and the magnetic sensing member 1147b can be fixed to the worm gear 1147. The disposition can also detect the angle variation between the magnetic member 1147a and the magnetic sensing member 1147b.

In summary, the luggage provided by the present invention is capable of holding the power supplying unit even if encountering a bump or an impact by the holding part. Therefore, a sudden breakout of power supplying can be prevented so that a reliability of the luggage is increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A piece of luggage, comprising:
a main body, comprising:
a moving module, comprising:
a plurality of wheels, the plurality of wheels comprising an active wheel; and
a main motor electrically connected to the active wheel; and
a power unit disposed in the main body and electrically connected to the moving module; and
a power supplying module, comprising:
a power supplying unit, comprising:
a power supplying box having an output port; and
a battery disposed in the power supplying box, wherein the output port is electrically connected to the battery; and
a connecting unit, comprising:
a connecting part having a power port, wherein the power port is corresponding to the output port;
a holding part connected to the connecting part; and
a conducting wire connected to the connecting part and electrically connected to the power port and the power unit, wherein the connecting unit is connected to the main body through the conducting wire;

wherein when the power port is connected to the output port, the power supplying unit is electrically connected to the power unit, and the holding part abuts against the power supplying box to hold the power supplying unit, and wherein an accommodating space is formed on the main body, the luggage further comprises:
a storage bag attached to the main body and disposed in the accommodating space, the storage bag comprising:
a bag body, wherein the power supplying module is disposed in the bag body, and the conducting wire is connected to the main body and passes through the bag body; and
at least one fixing member disposed on the bag body, wherein the bag body is mounted to the main body through the at least one fixing member.

2. The luggage of claim 1, wherein a concaved portion is formed on the power supplying box, the holding part comprises a chuck, the chuck is pivoted to the connecting part, when the holding part holds the power supplying unit, the chuck clamps the concaved portion.

3. The luggage of claim 2, wherein the holding part further comprises an elastic member disposed between the chuck and the connecting part.

4. The luggage of claim 1, wherein the connecting unit further comprises a locking part, the locking part comprises a locking housing and a locking member, the conducting wire passes through the locking housing, the locking member is inbuilt in the locking housing, the main body further comprises a wall, and the locking housing and the conducting wire are fixed on the wall through the locking member.

5. The luggage of claim 1, wherein the power supplying box further has an input port and an auxiliary port, the input port and the auxiliary port are electrically connected to the battery, the input port is configured to be electrically connected to an external power source, and the auxiliary port is configured to be electrically connected to a portable device.

6. The luggage of claim 5, wherein the power supplying box further comprises a plurality of cover portions, and the plurality of cover portions are movably connected to the power supplying box and cover the input port and the auxiliary port.

7. The luggage of claim 1, wherein the bag body comprises a first bag portion and a second bag portion, the first bag portion comprises a first top edge, a first bottom edge, a first side edge and a second side edge, the first side edge and the second side edge are both adjacent to the first top edge and the first bottom edge, the second bag portion comprises a second top edge, a second bottom edge, a third side edge and a fourth side edge, the third side edge and the fourth side edge are both adjacent to the second top edge and the second bottom edge, the first bottom edge is fixed to the second bottom edge, a zipper is disposed on the first top edge, the first side edge, the second side edge, the second top edge, the third side edge and the fourth side edge, and the second bag portion is selectively connected to the first bag portion through the zipper.

8. The luggage of claim 7, wherein the main body further comprises:
a control unit disposed in the main body and electrically connected to the power unit and the moving module;
wherein the storage bag further comprises a transducer disposed on the bag body and electrically connected to the power unit and the control unit, the zipper comprises a zipper slider, when at least one wheel of the plurality of wheels is rolling on a floor and the transducer does not detect the zipper slider locating at a predetermined position, the control unit controls the main motor to stop operating.

9. The luggage of claim 7, further comprising:
a control unit disposed in the main body and electrically connected to the power unit; and
an indication module electrically connected to the power unit and the control unit and comprising an alarm unit;
wherein the storage bag further comprises a transducer, the transducer is disposed on the bag body and electrically connected to the power unit and the control unit, the zipper comprises a zipper slider, when at least one wheel of the plurality of wheels is rolling on a floor and the transducer does not detect the zipper slider locating at a predetermined position, the control unit controls the alarm unit to raise an alarm.

10. The luggage of claim 1, wherein the bag body comprises a first bag portion and a second bag portion, the second bag portion is openably connected to the first bag portion, and the storage bag further comprises:
a first inner lining part fixed to the first bag portion and comprising a first connecting feature; and
a second inner lining part fixed to the second bag portion and comprising a second connecting feature, wherein the second connecting feature is corresponding to the first connecting feature;
wherein when the second bag portion is opened relative to the first bag portion and the first inner lining part is connected to the second inner lining part through the first connecting feature and the second connecting feature, the first bag portion, the first inner lining part, the second bag portion and the second inner lining part cooperatively defines a storage space.

11. The luggage of claim 10, wherein the first bag portion comprises a first top edge, a first bottom edge, a first side edge and a second side edge, the first side edge and the second side edge are both adjacent to the first top edge and the first bottom edge, the second bag portion comprises a second top edge, a second bottom edge, a third side edge and a fourth side edge, the third side edge and the fourth side edge are both adjacent to the second top edge and the second bottom edge, and the first inner lining part further comprises:
a first side edge inner lining fixed to the first side edge; and
a second side edge inner lining fixed to the second side edge;
wherein the second inner lining part further comprises:
a third side edge inner lining fixed to the third side edge; and
a fourth side edge inner lining fixed to the fourth side edge;
wherein the first connecting feature comprises:
a first connecting part disposed on the first side edge inner lining; and
a second connecting part disposed on the second side edge inner lining;
wherein the second connecting feature comprises:
a third connecting part disposed on the third side edge inner lining; and
a fourth connecting part disposed on the fourth side edge inner lining;
wherein when the first inner lining part is connected to the second inner lining part through the first connecting feature and the second connecting feature, the first side edge inner lining is connected to the third side edge inner lining through the first connecting part and the third connecting part, and the second side edge inner lining is connected to the fourth side edge inner lining through the second connecting part and the fourth connecting part.

12. The luggage of claim 10, wherein the main body further comprises a rib portion, the storage bag further comprises an auxiliary inner lining part and an auxiliary connecting part, the auxiliary inner lining part is fixed on an edge of the first bag portion, the auxiliary connecting part is disposed to a location on the first bag portion corresponding to the rib portion, the auxiliary inner lining part and the auxiliary connecting part respectively comprise a binding feature, and the auxiliary inner lining part is selectively bound to the auxiliary connecting part through the binding feature.

13. The luggage of claim 1, wherein the at least one fixing member is ring-shaped or sheet-shaped and a shape of the least one fixing member is corresponding to a portion of the accommodating space, and a rigidity of the at least one fixing member is greater than a rigidity of the bag body.

14. The luggage of claim 1, further comprising:
a control unit disposed in the main body and electrically connected to the power unit and the moving module; and
an indication module electrically connected to the power unit and the control unit and comprising an alarm unit;
wherein when electricity of the battery is lower than a predetermined threshold, the control unit controls the alarm unit to raise an alarm.

15. The luggage of claim 14, wherein the indication module further comprises a communication unit, the alarm unit is disposed on a wearable device, the communication unit is electrically connected to the alarm unit, when the electricity of the battery is lower than the predetermined threshold, the control unit controls the communication unit to send out a signal to activate the alarm unit to raise the alarm.

16. The luggage of claim 1, further comprising:
a control unit disposed in the main body and electrically connected to the power unit and the moving module, and the moving module further comprising:
an elevating mechanism disposed in the main body and electrically connected to the power unit and the control unit, the elevating mechanism comprising:
a housing;
an elevating motor disposed in the housing;
a first link pivoted to the housing and coupled to the elevating motor;
a pivoting member connected to the housing; and
a second link pivoted to the housing through the pivoting member, wherein a center of the active wheel is fixed relative to the second link, and an end of the first link is slidably connected to the second link;
wherein when the elevating motor drives the first link to drive the second link and the active wheel to revolve to a descending position, the active wheel extrudes from the housing and contacts a floor;
wherein when electricity of the battery is lower than the predetermined threshold, the control unit controls the elevating motor to drive the first link to drive the second link and the active wheel to revolve to an ascending position, so as to make the active wheel leave the floor and a portion of the active wheel accommodated in the housing.

17. The luggage of claim 16, wherein the elevating mechanism further comprises a base disposed in the housing, the base is pivoted to the housing through the pivoting member and moves synchronously with the second link, the active wheel is pivoted to the base, and the main motor is disposed on the base.

18. The luggage of claim 17, wherein the elevating mechanism further comprises a damper connected to the second link and the base, the second link comprises a limiting portion, and the base abuts against the limiting portion.

19. The luggage of claim 16, wherein the elevating mechanism further comprises a worm and a worm gear, the elevating motor is coupled to the worm, the first link is fixed to the worm gear, the worm is engaged to the worm gear, and a magnetic member and a magnetic sensing member are disposed on the worm gear.

* * * * *